United States Patent
Basu Mallick et al.

(10) Patent No.: US 10,701,549 B2
(45) Date of Patent: Jun. 30, 2020

(54) PROCEDURES FOR GROUPING WEARABLE DEVICES WITH LTE MASTER UES

(71) Applicants: Panasonic Intellectual Property Corporation of America, Torrance, CA (US); Prateek Basu Mallick, Hessen (DE)

(72) Inventors: Prateek Basu Mallick, Hessen (DE); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/091,668

(22) PCT Filed: Feb. 15, 2017

(86) PCT No.: PCT/EP2017/053359
§ 371 (c)(1),
(2) Date: Oct. 5, 2018

(87) PCT Pub. No.: WO2017/174241
PCT Pub. Date: Oct. 12, 2017

(65) Prior Publication Data
US 2019/0159018 A1 May 23, 2019

(30) Foreign Application Priority Data
Apr. 8, 2016 (EP) .................................. 16164538

(51) Int. Cl.
*H04W 12/04* (2009.01)
*H04W 8/18* (2009.01)
(Continued)

(52) U.S. Cl.
CPC ............ *H04W 8/186* (2013.01); *H04W 4/023* (2013.01); *H04W 8/005* (2013.01); *H04W 24/08* (2013.01); *H04W 88/04* (2013.01)

(58) Field of Classification Search
CPC ..... H04W 8/186; H04W 24/08; H04W 4/023; H04W 88/04; H04W 8/005
See application file for complete search history.

(56) References Cited

U.S. PATENT DOCUMENTS

| 2014/0162668 A1* | 6/2014 | Na | H04W 72/121 |
| | | | 455/450 |
| 2017/0265018 A1* | 9/2017 | Mok | H04W 4/70 |
| 2018/0026788 A1* | 1/2018 | Zhang | H04L 9/083 |
| | | | 713/168 |

OTHER PUBLICATIONS (3GPP TS 23.303v13.3.0); Mar. 2016, Proximity-based services (ProSe), R13.*

(Continued)

*Primary Examiner* — Lakeram Jangbahadur
(74) *Attorney, Agent, or Firm* — Seed IP Law Group LLP

(57) ABSTRACT

The invention relates to an improved grouping procedure performed by a master mobile terminal for grouping with a remote mobile terminal. The master mobile terminal and the remote mobile terminal are connected to a radio base station. The master mobile terminal may serve as a relay for remote mobile terminals so as to relay communication between the remote mobile terminals and the radio base station. A transmitter and receiver of the master mobile terminal discovers the remote mobile terminal and an identifier of the remote mobile terminal. The transmitter transmits a group request message to the radio base station, which comprises the remote mobile terminal identifier and a request to group the remote mobile terminal with the master mobile terminal. The receiver receives a group request confirm message from the radio base station, confirming that the remote mobile (Continued)

terminal and the master mobile terminal are grouped together.

17 Claims, 13 Drawing Sheets

(51) Int. Cl.
    *H04W 8/00*     (2009.01)
    *H04W 88/04*     (2009.01)
    *H04W 4/02*     (2018.01)
    *H04W 24/08*     (2009.01)

(56) References Cited

OTHER PUBLICATIONS

3GPP, "3rd Generation Partnership Project; Technical Specification Group Services and System Aspects; Proximity-based services (ProSe); Stage 2 (Release 13)," Technical Specification 23.303, Version 13.0.0, Jun. 2015, 97 pages.
3GPP, "3rd Generation Partnership Project; Technical Specification Group Services and System Aspects; Proximity-based services (ProSe); Stage 2 (Release 13)," Technical Specification 23.303, Version 13.2.0, Dec. 2015, 122 pages.
3GPP, "3rd Generation Partnership Project; Technical Specification Group Services and System Aspects; Proximity-based services (ProSe); Stage 2 (Release 13)," Technical Specification 23.303, Version 13.3.0, Mar. 2016, 124 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.6.1, Mar. 2016, 365 pages.
3GPP, "3rd Generation Partnership Project; Technical Specification Group Services and System Aspects; Study on extended architecture support for proximity-based services (Release 13)," Technical Report 23.713, Version 13.0.0, Sep. 2015, 80 pages.
3GPP, "3rd Generation Partnership Project; Technical Specification Group Services and System Aspects; 3GPP System Architecture Evolution (SAE); Security architecture (Release 13)," Technical Specification 33.401, Version 13.1.0, Dec. 2015, 135 pages.
3GPP, "3rd Generation Partnership Project; Technical Specification Group Radio Access Network; Evolved Universal Terrestrial Radio Access (E-UTRA); Physical channels and modulation (Release 8)," Technical Specification 36.211, Version 8.0.0, Sep. 2007, 50 pages.
3GPP, "3rd Generation Partnership Project; Technical Specification Group Radio Access Network; Evolved Universal Terrestrial Radio Access (E-UTRA); Physical channels and modulation (Release 13)," Technical Specification 36.211, Version 13.0.0, Dec. 2015, 141 pages.
3GPP, "$3^{rd}$ Generation Partnership Project; Technical Specification Group Radio Access Network; Evolved Universal Terrestrial Radio Access (E-UTRA); Multiplexing and channel coding (Release 13)," Technical Specification 36.212, Version 13.0.0, Dec. 2015, 121 pages.
3GPP, "$3^{rd}$ Generation Partnership Project; Technical Specification Group Radio Access Network; Evolved Universal Terrestrial Radio Access (E-UTRA); Physical layer procedures (Release 13)," Technical Specification 36.213, Version 13.0.0, Dec. 2015, 326 pages.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.2.0, Dec. 2015, 290 pages.
3GPP, "$3^{rd}$ Generation Partnership Project; Technical Specification Group Radio Access Network; Evolved Universal Terrestrial Radio Access (E-UTRA); User Equipment (UE) procedures in idle mode (Release 13)," Technical Specification 36.304, Version 13.1.0, Mar. 2016, 43 pages.
3GPP, "3rd Generation Partnership Project; Technical Specification Group Radio Access Network; Evolved Universal Terrestrial Radio Access (E-UTRA); Medium Access Control (MAC) protocol specification (Release 13)," Technical Specification 36.321, Version 13.0.0, Dec. 2015, 82 pages.
3GPP, "3rd Generation Partnership Project; Technical Specification Group Radio Access Network; Evolved Universal Terrestrial Radio Access (E-UTRA); Radio Resource Control (RRC); Protocol specification (Release 13)," Technical Specification 36.331, Version 13.0.0, Dec. 2015, 507 pages.
Ericsson, "Revised WI: Further LTE Physical Layer Enhancements for MTC," RP-141865, *3GPP TSG RAN Meeting #66*, Edinburgh, Scotland, Sep. 9-12, 2014, 8 pages.
ETSI, "Universal Mobile Telecommunications System (UMTS); LTE; Proximity-based services (ProSe); Stage 2," Technical Specification 123 303, Version 13.3.0, Apr. 2016, 84 pages.
Extended European Search Report, dated Jun. 17, 2016, for European Application No. 16164538.7-1870, 7 pages.
International Search Report and Written Opinion, dated Apr. 13, 2017, for International Application PCT/EP2017/053359, 9 pages.
Qualcomm Incorporated et al., "New SI: Further Enhancements LTE Device to Device, UE to Network Relays for Wearables," RP-160677, *3GPP TSG RAN Meeting #71*, Gothenburg, Sweden Mar. 7-10, 2016, 7 pages.

* cited by examiner

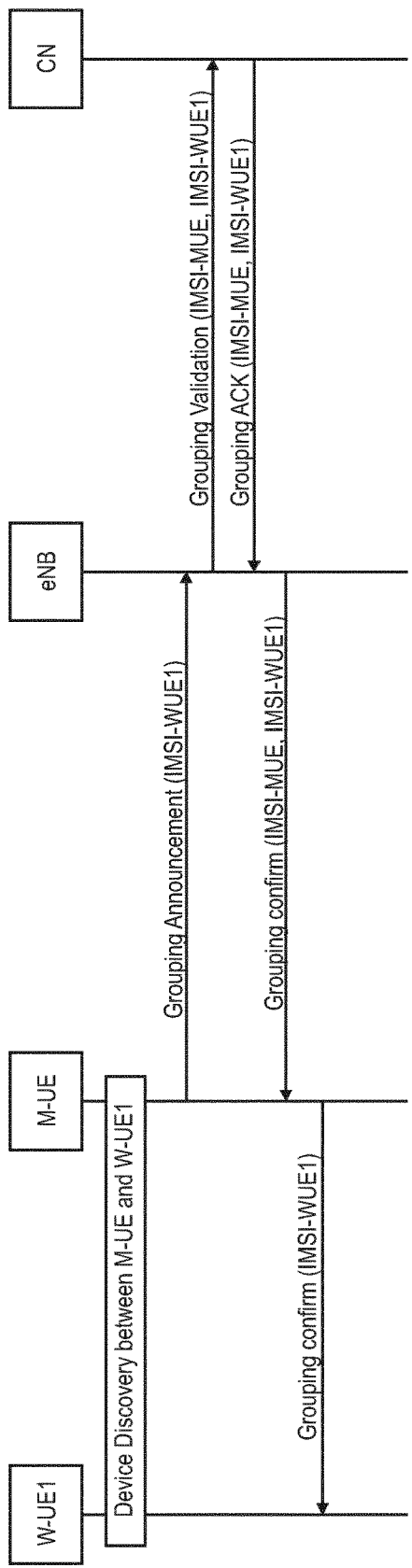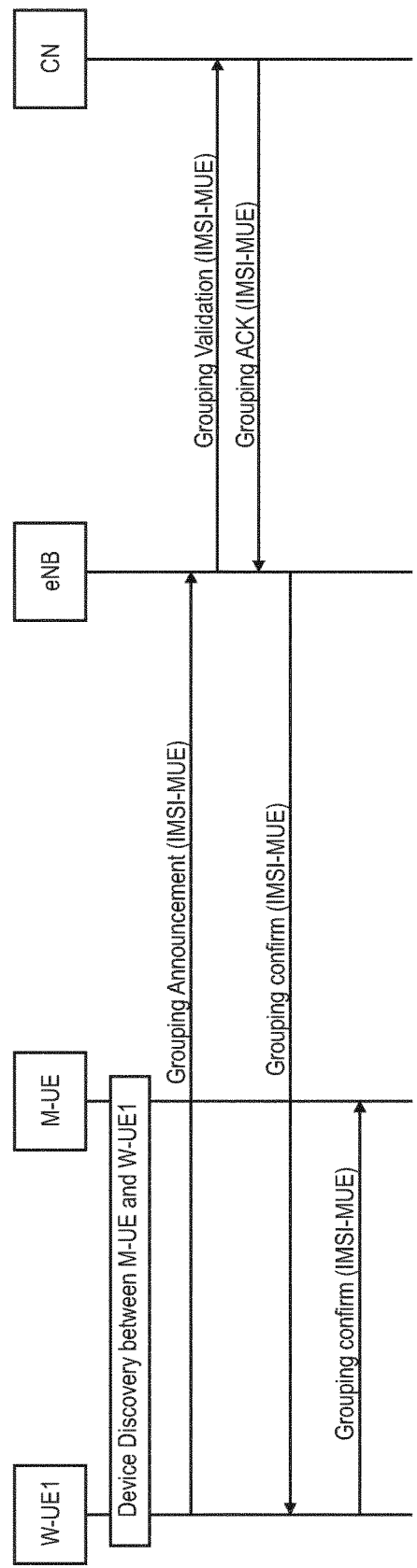

PROCEDURES FOR GROUPING WEARABLE DEVICES WITH LTE MASTER UES

BACKGROUND

Technical Field

The present disclosure relates to an improved grouping procedure for grouping a master UE and a wearable UE. The present disclosure is providing the corresponding master and remote mobile terminals as well as the radio base station, and corresponding methods.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block." A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)," current version 13.0.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair," or equivalent "RB pair" or "PRB pair."

The term "component carrier" refers to a combination of several resource blocks in the frequency domain. In future releases of LTE, the term "component carrier" is no longer used; instead, the terminology is changed to "cell," which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by, e.g., the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks, etc. More information on the functioning of the physical layer can be found in the 3GPP technical standard 36.213 current version 13.0.0, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer. The main services and functions of the RLC sublayer include:

- Transfer of upper layer PDUs supporting AM, UM or TM data transfer;
- Error Correction through ARQ;
- Segmentation according to the size of the TB;
- Resegmentation when necessary (e.g. when the radio quality, i.e. the supported TB size changes)
- Concatenation of SDUs for the same radio bearer is FFS;
- In-sequence delivery of upper layer PDUs;
- Duplicate Detection;
- Protocol error detection and recovery;
- SDU discard;
- Reset The ARQ functionality provided by the RLC layer will be discussed in more detail at a later part.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/L2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding," section 5.3.3.1 (current version v13.0.0 available at http://www.3gpp.org and incorporated herein by reference). For instance, the following DCI Formats can be used to carry a resource grant for the uplink.

The 3GPP technical standard TS 36.212, current version 13.0.0, defines in subclause 5.4.3, incorporated herein by reference, control information for the sidelink.

LTE RRC States

LTE is based on only two main states: "RRC_IDLE" and "RRC_CONNECTED."

In RRC_IDLE the radio is not active, but an ID is assigned and tracked by the core network. More specifically, a mobile terminal in RRC_IDLE performs cell selection and reselection—in other words, it decides on which cell to camp. The cell (re)selection process takes into account the priority of each applicable frequency of each applicable Radio Access Technology (RAT), the radio link quality and the cell status (i.e., whether a cell is barred or reserved). An RRC_IDLE mobile terminal monitors a paging channel to detect incoming calls, and also acquires system information. The system information mainly consists of parameters by which the network (E-UTRAN) can control the cell (re) selection process and also how the mobile terminal accesses the network. RRC specifies the control signaling applicable for a mobile terminal in RRC_IDLE, namely paging and system information. The mobile terminal behavior in RRC_IDLE is specified in more detail, e.g., in TS 36.304, current version 13.1.0, chapter 4 "General description of Idle mode" incorporated herein by reference.

In RRC_CONNECTED the mobile terminal has an active radio operation with contexts in the eNodeB. The E-UTRAN allocates radio resources to the mobile terminal to facilitate the transfer of (unicast) data via shared data channels. To support this operation, the mobile terminal monitors an associated control channel which is used to indicate the dynamic allocation of the shared transmission resources in time and frequency. The mobile terminal provides the network with reports of its buffer status and of the downlink channel quality, as well as neighboring cell measurement information to enable E-UTRAN to select the most appropriate cell for the mobile terminal. These measurement reports include cells using other frequencies or RATs. The UE also receives system information, consisting mainly of information required to use the transmission channels. To extend its battery lifetime, a UE in RRC_CONNECTED may be configured with a Discontinuous Reception (DRX) cycle. RRC is the protocol by which the E-UTRAN controls the UE behavior in RRC_CONNECTED.

The various functions of the mobile terminal in RRC Protocol for and including Connected Mode are described in 3GPP TS 36.331, current version 13.0.0, in Ch. 5 "Procedures," incorporated herein by reference. The RRC Connection Establishment procedure is explained in section 5.3.3 of 3GPP TS 36.331, and is incorporated herein by reference too.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D," "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

D2D Discovery—Models and Resource Allocation

ProSe Direct Discovery is defined as the procedure used by the ProSe-enabled UE to discover other ProSe-enabled UE(s) in its proximity using E-UTRA direct radio signals via PC5. Upper layer handles authorization for announcement and monitoring of discovery information. For this purpose, UEs have to exchange predefined signals, referred to as "discovery signals." By checking discovery signals periodically, a UE maintains a list of proximity UEs in order to establish a communication link when needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information, e.g., "find a taxi nearby," "find me a coffee shop." Additionally depending on the information obtained, ProSe Direct Discovery can be used for subsequent actions, e.g., to initiate ProSe Direct Communication.

The following models for ProSe Direct Discovery are defined in the standard 3GPP TS 23.303, current version 13.0.0, section 5.3 and all subsections thereof, incorporated herein by reference.

Model a ("I am Here"):

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at pre-defined discovery intervals and the monitoring UEs that are interested in these messages read them and process them. This model may be referred to as "I am here" since the announcing UE would broadcast information about itself, e.g., its ProSe Application Code in the discovery message.

Model B ("Who is There?"/"are You There?"):

This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

It can be referred to as "who is there/are you there" since the discoverer UE sends information for other UEs that would like to receive responses, e.g., the information can be about a ProSe Application Identity corresponding to a group and the members of the group can respond.

The content of the discovery information is transparent to the Access Stratum (AS), and no distinction is made in the AS for ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Generally, device discovery is needed periodically. Further, D2D devices utilize a discovery message signaling protocol to perform device discovery. For example, a D2D-enabled UE can transmit its discovery message, and another D2D-enabled UE receives this discovery message and can use the information to establish a direct communication link. An advantage of a hybrid network is that if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

UE autonomous resource selection (called Type 1 subsequently): A resource allocation procedure where resources for announcing discovery information are allocated on a non UE specific basis, further characterized by:

The eNB provides the UE(s) with the resource pool configuration used for announcing of discovery information. The configuration may be, e.g., signaled in SIB.

The UE autonomously selects radio resource(s) from the indicated resource pool and announces discovery information.

The UE can announce discovery information on a randomly selected discovery resource during each discovery period.

Scheduled resource allocation (called Type 2 subsequently): A resource allocation procedure where resources for announcing discovery information are allocated on a per-UE-specific basis, further characterized by:

The UE in RRC_CONNECTED may request resource(s) for announcing of discovery information from the eNB via RRC. The eNB assigns resource(s) via RRC.

The resources are allocated within the resource pool that is configured in UEs for monitoring.

For UEs in RRC_IDLE the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED:

A UE authorized to perform ProSe Direct Discovery announcement indicates to the eNB that it wants to perform D2D discovery announcement The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource (s) by RRC signaling or b) the UE enters IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

ProSe Direct Communication Related Identities

3GPP TS 36.300, current version 13.2.0, defines in sub-clause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCD for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.

Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined, e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

The following rules with respect to the resource allocation mode apply for the UE:

If the UE is out-of-coverage, it can only use Mode 2;
If the UE is in-coverage, it may use Mode 1 if the eNB configures it accordingly;
If the UE is in-coverage, it may use Mode 2 if the eNB configures it accordingly;
When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;
The UE considers itself to be in exceptional conditions, e.g., while T311 or T301 is running;
When an exceptional case occurs the UE is allowed to use Mode 2 temporarily even though it was configured to use Mode 1.

While being in the coverage area of an E-UTRA cell, the UE shall perform ProSe Direct Communication Transmission on the UL carrier only on the resources assigned by that cell, even if resources of that carrier have been pre-configured, e.g., in UICC (Universal Integrated Circuit Card).

For UEs in RRC_IDLE the eNB may select one of the following options:

The eNB may provide a Mode 2 transmission resource pool in SIB. UEs that are authorized for ProSe Direct Communication use these resources for ProSe Direct Communication in RRC_IDLE;
The eNB may indicate in SIB that it supports D2D but does not provide resources for ProSe Direct Communication. UEs need to enter RRC_CONNECTED to perform ProSe Direct Communication transmission.

For UEs in RRC_CONNECTED:

A UE in RRC_CONNECTED that is authorized to perform ProSe Direct Communication transmission, indicates to the eNB that it wants to perform ProSe Direct Communication transmissions when it needs to perform ProSe Direct Communication transmission;
The eNB validates whether the UE in RRC_CONNECTED is authorized for ProSe Direct Communication transmission using the UE context received from MME;
The eNB may configure a UE in RRC_CONNECTED by dedicated signaling with a Mode-2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and rely on Mode 1 otherwise.

The resource pool for Scheduling Assignment when the UE is out of coverage can be configured as below:

The resource pool used for reception is pre-configured.
The resource pool used for transmission is pre-configured.

The resource pool for Scheduling Assignment when the UE is in coverage can be configured as below:

The resource pool used for reception is configured by the eNB via RRC, in dedicated or broadcast signaling.
The resource pool used for transmission is configured by the eNB via RRC if Mode 2 resource allocation is used
The SCI (Sidelink Control Information) resource pool (also referred to as Scheduling Assignment, SA, resource pool) used for transmission is not known to the UE if Mode 1 resource allocation is used.
The eNB schedules the specific resource(s) to use for Sidelink Control Information (Scheduling Assignment) transmission if Mode 1 resource allocation is used. The specific resource assigned by the eNB is within the resource pool for reception of SCI that is provided to the UE.

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI.
Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 13.0.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects resources for the SA and D2D data transmission from the transmission resource pool(s) configured and provided by the eNB.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 6 illustrates the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. A SC period is the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode2_Tx_pool. The 1st transmission of the SA is followed, e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU (i.e., a transport block) consists of its 1st initial transmission and several retransmissions. For the illustration of FIG. 6 (and of FIG. 7) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions ($2^{nd}$, $3^{rd}$ and $4^{th}$ transmission). The SA pattern basically defines the timing of the SA's initial transmission and its retransmissions ($2^{nd}$, $3^{rd}$ and $4^{th}$ transmission).

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 6, the Model T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.0.0, section 5.14, incorporated herein by reference. Therein, the Mode-2 autonomous resource selection is described in detail, differentiating between being configured with a single radio resource pool or multiple radio resource pools. The following steps are taken from said section of TS 36.321, assuming Mode-2 autonomous resource selection:

In order to transmit on the SL-SCH (sidelink shared channel) the MAC entity must have at least one sidelink grant. Sidelink grants are selected as follows:

If the MAC entity is configured by upper layers to transmit using one or multiple pool(s) of resources and more data is available in STCH (sidelink traffic channel) than can be transmitted in the current SC period, the MAC entity shall for each sidelink grant to be selected:

if configured by upper layers to use a single pool of resources:
        select that pool of resources for use;
    else, if configured by upper layers to use multiple pools of resources:
        select a pool of resources for use from the pools of resources configured by upper layers whose associated priority list includes the priority of the highest priority of the sidelink logical channel in the MAC PDU to be transmitted;

NOTE: If more than one pool of resources has an associated priority list which includes the priority of the sidelink logical channel with the highest priority in the MAC PDU to be transmitted, it is left for UE implementation which one of those pools of resources to select.

randomly select the time and frequency resources for SL-SCH and SCI of a sidelink grant from the selected resource pool. The random function shall be such that each of the allowed selections can be chosen with equal probability;

use the selected sidelink grant to determine the set of subframes in which transmission of SCI and transmission of first transport block occur according to sub-clause 14.2.1 of TS 36.213 incorporated herein by reference (this step refers to the selection of a T-RPT and a SA pattern, as explained in connection with FIG. 7);

consider the selected sidelink grant to be a configured sidelink grant occurring in those subframes starting at the beginning of the first available SC Period which starts at least 4 subframes after the subframe in which the sidelink grant was selected;

clear the configured sidelink grant at the end of the corresponding SC Period;

NOTE: Retransmissions on SL-SCH cannot occur after the configured sidelink grant has been cleared.

NOTE: If the MAC entity is configured by upper layers to transmit using one or multiple pool(s) of resources, it is left for UE implementation how many sidelink grants to select within one SC period taking the number of sidelink processes into account.

The MAC entity shall for each subframe:

if the MAC entity has a configured sidelink grant occurring in this subframe:

if the configured sidelink grant corresponds to transmission of SCI:

instruct the physical layer to transmit SCI corresponding to the configured sidelink grant.

else if the configured sidelink grant corresponds to transmission of first transport block:

deliver the configured sidelink grant and the associated HARQ information to the Sidelink HARQ Entity for this subframe.

NOTE: If the MAC entity has multiple configured grants occurring in one subframe and if not all of them can be processed due to the single-cluster SC-FDM restriction, it is left for UE implementation which one of these to process according to the procedure above.

The above text taken from the 3GPP technical standard can be clarified further. For example, the step of randomly selecting the time and frequency resources is random as to which particular time/frequency resources are chosen but is, e.g., not random as to the amount of time/frequency resources selected in total. The amount of resources selected from the resource pool depends on the amount of data that is to be transmitted with said sidelink grant to be selected autonomously. In turn, the amount of data that is to be transmitted depends on the previous step of selecting the ProSe destination group and the corresponding amount of data ready for transmission destined to said ProSe destination group. As described later in the sidelink LCP procedure, the ProSe destination is selected first.

Furthermore, the sidelink process associated with the sidelink HARQ entity is responsible for instructing the physical layer to generate and perform a transmission accordingly, as apparent from section 5.14.1.2.2 of 3GPP TS 36.321 v13.0.0, incorporated herein by reference. In brief, after determining the sidelink grant and the sidelink data to transmit, the physical layer takes care that the sidelink data is actually transmitted, based on the sidelink grant and the necessary transmission parameters.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

ProSe Network Architecture and ProSe Entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling, etc., related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:

Exchange of ProSe control information between ProSe-enabled UE and the ProSe Function over PC3 reference point.

Procedures for open ProSe Direct Discovery of other ProSe-enabled UEs over PC5 reference point.

Procedures for one-to-many ProSe Direct Communication over PC5 reference point.

Procedures to act as a ProSe UE-to-Network Relay. The Remote UE communicates with the ProSe UE-to-Network Relay over PC5 reference point. The ProSe UE-to-Network Relay uses layer-3 packet forwarding.

Exchange of control information between ProSe UEs over PC5 reference point, e.g., for UE-to-Network Relay detection and ProSe Direct Discovery.

Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.

Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

ProSe UE-to-Network Relay

A UE may also support the functionality and procedure(s) so as to act as a ProSe UE-to-Network Relay, such that a Remote UE communicates with the ProSe UE-to-Network Relay over the PC5 reference point. ProSe UE-to-Network Relay operation will be specified within 3GPP Release 13, specifically in 3GPP TS 23.303 current version 13.3.0 and TR 23.713 current version 13.0.0, incorporated herein by reference

- For the ProSe UE-to-Network Relay discovery and ProSe relay (re)selection both scenarios where Remote UEs are in-coverage and out-of-coverage can be addressed.
- Relay UE will always be in-coverage.
- When Remote UE is in-coverage for relay discovery purposes, the monitoring and transmitting resources for discovery can be provided, e.g., by the eNB using the Rel-12 mechanisms (broadcast for idle mode and dedicated signaling for connected mode). The remote UE can decide when to start monitoring.
- When the Remote UE is out of coverage, the monitoring and transmitting resources for discovery and communication (actual data transfer) can be provided, e.g., by pre-configuration, i.e., by way of specification/operator configuration (in USIM, etc.) such that the UE exactly knows which resources to use.

ProSe UE-to-Network Relay (Re)Selection:

- The Remote UE can take radio level measurements of the PC5 radio link quality into account for the ProSe UE-to-Network Relay selection procedure.
- For the case that the Remote UE is out-of-coverage, the radio level measurements can be used by the remote UE together with other higher layer criteria to perform relay selection.
- For the case that Remote UE is out-of-coverage, the criteria for reselection is based on PC5 measurements (RSRP or other RAN1 agreed measurements) and higher layer criteria. The relay reselection can be triggered by the remote UE.

The ProSe UE-to-Network relay may use layer-3 packet forwarding. Control information between ProSe UEs can be exchanged over the PC5 reference point, e.g., for UE-to-Network Relay detection and ProSe Direct Discovery.

A ProSe-enabled UE will also support the exchange of ProSe control information between another ProSe-enabled UE and the ProSe Function over the PC3 reference point. In the ProSe UE-to-Network Relay case, the Remote UE will send this control information over the PC5 user plane to be relayed over the LTE-Uu interface towards the ProSe Function.

The ProSe UE-to-Network Relay entity provides the functionality to support connectivity to "unicast" services for Remote UEs that are not in the coverage area of an eNB, i.e., not connected to E-UTRAN. FIG. 9 shows a ProSe UE-to-Network Relay scenario. The ProSe UE-to-Network Relay shall relay unicast traffic (UL and/or DL) between the Remote UE and the network. The ProSe UE-to-Network Relay shall provide a generic function that can relay any type of traffic that is relevant for public safety communication.

One-to-one Direct Communication between Remote UEs and ProSe UE-to-Network Relays has the following characteristics:

- Communication over PC5 reference point is connectionless.
- ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

ProSe UE-to-Network Relaying May Include the Following Functions:

- ProSe Direct discovery following Model A or Model B can be used in order to allow the Remote UE to discover ProSe UE-to-Network Relay(s) in proximity.
- ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.
- Act as an "announcing" or "discoveree" UE on the PC5 reference point supporting direct discovery.
- Act as a default router to the Remote UEs forwarding IP packets between the UE-ProSe UE-to-Network Relay point-to-point link and the corresponding PDN connection.
- Handle Router Solicitation and Router Advertisement messages as defined in IETF RFC 4861.
- Act as DHCPv4 Server and stateless DHCPv6 Relay Agent.
- Act as a NAT if IPv4 is used replacing the locally assigned IPv4 address of the Remote UE with its own.
- Map the L2 link ID used by the Remote UE as Destination Layer-2 ID to the corresponding PDN connection supported by the ProSe UE-to-Network Relay.

The user plane protocol architecture for the ProSe UE-to-Network relay is shown in FIG. 10.

Both Model A and Model B discovery are supported, as discussed before for the usual Rel.-12 direct discovery between two ProSe UEs, where Model A uses a single discovery protocol message (UE-to-Network Relay Discovery Announcement) and Model B uses two discovery protocol messages (UE-to-Network Relay Discovery Solicitation and UE-to-Network Relay Discovery Response).

ProSe UE-to-Network Relay Discovery

Both Model A and Model B discovery are supported, as discussed before for the usual Rel.-12 direct discovery between two ProSe UEs, where Model A uses a single discovery protocol message (UE-to-Network Relay Discovery Announcement) and Model B uses two discovery protocol messages (UE-to-Network Relay Discovery Solicitation and UE-to-Network Relay Discovery Response). Details on Relay Discovery can be found in section 6 of 3GPP TR 23.713 current version v13.0.0 incorporated herein by reference.

The following parameters are common to all of UE-to-Network Relay Discovery, Group Member Discovery and UE-to-UE Relay Discovery:

- Message type: Announcement (Model A) or Solicitation/Response (Model B), Relay Discovery Additional Information (Model A).
- Discovery type: indicates whether this is UE-to-Network Relay Discovery, Group Member Discovery or UE-to-UE Relay Discovery.

The following parameters are used in the UE-to-Network Relay Discovery Announcement message (Model A):

ProSe Relay UE ID: link layer identifier that is used for direct communication and is associated with a PDN connection the ProSe UE-to-Network Relay has established.

Announcer info: provides information about the announcing user.

Relay Service Code: parameter identifying a connectivity service the ProSe UE-to-Network Relay provides to Public Safety applications. The Relay Service Codes are configured in a ProSe UE-to-Network relay for advertisement and map in the ProSe UE-to-Network relay to specific APNs they offer connectivity to. Additionally, the Relay Service Code also identifies authorized users the ProSe UE-to-Network relay would offer service to, and may select the related security policies or information, e.g., necessary for authentication and authorization between the Remote UE and the ProSe UE-to-Network Relay (e.g., a Relay Service Code for relays for police members only would be different than a Relay Service code for relays for Fire Fighters only, even though potentially they provided connectivity to same APN, e.g., to support Internet Access).

Radio Layer Information: contains information about the radio layer information, e.g., radio conditions between the eNB and the UE-to-Network Relay, to assist the Remote UE selecting the proper UE-to-Network Relay.

The following parameters are used in the UE-to-Network Relay Discovery Solicitation message (Model B):

Discoverer info: provides information about the discoverer user.

Relay Service Code: information about connectivity that the discoverer UE is interested in. The Relay Service Codes are configured in the Prose Remote UEs interested in related connectivity services.

ProSe UE ID: link layer identifier of the discoverer that is used for direct communication (Model B).

The following parameters are used in the UE-to-Network Relay Discovery Response message (Model B):

ProSe Relay UE ID: link layer identifier that is used for direct communication and is associated with a PDN connection the ProSe UE-to-Network Relay has established.

Discoveree info: provides information about the discoveree.

Radio Layer Information: contains information about the radio layer information, e.g., radio conditions between the eNB and the UE-to-Network Relay, to assist the Remote UE selecting the proper UE-to-Network Relay.

ProSe Direction Communication Via the ProSe UE-to-Network Relay

The UE-to-Network Relay function will be specified based upon an evolution of the ProSe functionality already documented in TS 23.303.

A ProSe UE-to-Network Relay capable UE may attach to the network (if it is not already connected) and connect to a PDN connection enabling the necessary relay traffic, or it may need to connect to additional PDN connection(s) in order to provide relay traffic towards Remote UE(s). PDN connection(s) supporting UE-to-Network Relay shall only be used for Remote ProSe UE(s) relay traffic.

ProSe UE-to-Network Relay provides a generic L3 forwarding function that can relay any type of IP traffic between the Remote UE and the network. One-to-one ProSe Direct Communication is used between the Remote UE and the ProSe UE-to-Network Relay. The Remote UE is authorized by upper layer and can be in-coverage or out-of-coverage of EUTRAN for UE-to-Network Relay discovery, selection and communication. The ProSe UE-to-Network Relay UE is always in-coverage of EUTRAN.

The eNB controls whether the UE can act as a ProSe UE-to-Network Relay.

If the eNB broadcast any information associated to ProSe UE-to-Network Relay operation, then ProSe UE-to-Network Relay operation is supported in the cell.

The eNB may indicate that the ProSe UE-to-Network Relay operation is supported and may provide transmission and reception resource pool(s) for ProSe UE-to-Network Relay discovery in broadcast signaling.

The eNB may broadcast a minimum and/or a maximum Uu link quality (RSRP/RSRQ) threshold that the ProSe UE-to-Network Relay UE needs to respect to autonomously start/stop the UE-to-Network Relay discovery procedure using the broadcasted threshold(s). The eNB may configure none, one of the threshold or both thresholds.

If the eNB broadcast that the ProSe UE-to-Network Relay operation is supported but does not broadcast transmission resource pool for ProSe-UE-to Network Relay discovery, then UE can initiate request for ProSe-UE-to-Network Relay discovery resources by dedicated signaling. The eNB may configure the UE to become a ProSe-UE-to-Network Relay by dedicated signaling.

It should be noted that it is not yet clear if the eNB can optionally broadcast a minimum and/or a maximum Uu link quality (RSRP/RSRQ) threshold that the UEs need to respect before requesting transmitting relay discovery resources and if a differentiation of behavior between Model A and Model B is needed.

If the ProSe-UE-to-Network Relay is initiated by broadcast signaling, it can perform ProSe UE-to-Network Relay discovery when in RRC_IDLE. If the ProSe UE-to-Network Relay is initiated by dedicated signaling, it can perform relay discovery as long as it is in RRC_CONNECTED.

It should be noted that it is not yet clear if the pool is only for relay operation or for other PS discovery services as well, and if pool can be used by only ProSe UE-to-Network Relay, or by both ProSe UE-to-Network Relay and Remote UE.

It should be noted that it is not yet clear if the eNB can control the UEs on an individual basis if it is broadcasting relay discovery resources, and if a UE in connected mode can use the broadcast relay discovery resources.

It should be noted that it is not yet clear what the potential minimization of service interruption is for the cases where the UE is moving from in-coverage to out-of-coverage and from out-of-coverage to in-coverage.

A UE-to-Network Relay performing one-to-one sidelink communication has to be in RRC_CONNECTED. After receiving a layer-2 link establishment request (upper layer message) from the Remote UE, the ProSe UE-to-Network Relay indicates to the eNB that it intends to perform ProSe UE-to-Network Relay one-to-one communication. The eNB may provide resources for ProSe UE-to-Network Relay one-to-one communication.

The Remote UE performs radio measurements at the PC5 interface and uses same for ProSe UE-to-Network Relay selection and reselection along with higher layer criterion. A ProSe UE-to-Network Relay is considered suitable in terms of radio criteria if the PC5 link quality exceeds a configured threshold (pre-configured or provided by eNB). The Remote UE may also trigger ProSe UE-to-Network Relay reselection when it receives a layer-2 link release message (upper layer message) from ProSe UE-to-Network Relay. In RRC_CONNECTED state, after selecting a ProSe UE-to-Network Relay, the Remote UE informs the eNB that it intends to use ProSe UE-to-Network Relay one-to-one communication. The eNB may provide resources for ProSe UE-to-Network Relay one-to-one communication.

If Uu link quality is required for selection/reselection purposes is not yet decided. Further, the detailed criteria to select a new ProSe UE-to-Network Relay and the ranking of ProSe UE-to-Network Relays are not decided either.

When the Remote UE is in-coverage,
  transmission resources for ProSe UE-to-Network Relay discovery are provided by the eNB using broadcast for RRC_IDLE state and dedicated signaling for RRC_CONNECTED state.
  monitoring resources for ProSe UE-to-Network Relay discovery are provided by the eNB using broadcast signaling.

The remote UE can decide when to start monitoring for ProSe UE-to-Network Relay discovery. The Remote UE can transmit ProSe UE-to-Network Relay discovery solicitation message while in RRC_IDLE or in RRC_CONNECTED depending on the configuration of resources for ProSe UE-to-Network Relay discovery. The eNB may configure a threshold to control transmission of ProSe UE-to-Network Relay discovery solicitation message from the Remote UE. If the threshold is configured, the Remote UE is allowed to transmit ProSe UE-to-Network Relay discovery solicitation message only if the Uu link quality at the Remote UE is below the configured threshold.

NB-IoT/eMTC

Cellular-based Internet of Things (IoT) technologies have become an important branch of Internet of Everything (IoE). To meet the new connectivity requirements of the emerging massive IoT segment, 3GPP has taken evolutionary steps on both the network side and the device side.

The key improvement areas addressed in 3GPP up to Release 13 are:
  Lower device cost—cutting module cost for LTE devices by reducing peak rate, memory requirement and device complexity. The LTE module cost-reduction evolution started with the introduction of LTE for machine-type communication (LTE-M) Cat 1 devices with reduced peak rate to a maximum of 10 Mbps, and continued in Releases 12 and 13 with reduced device complexity for lower performance and using less bandwidth or a narrowband IoT carrier to cut costs further.
  Improved battery life—more than 10 years of battery life can be achieved by introducing Power Saving Mode and/or extended discontinuous reception (eDRX) functionality. These features allow the device to contact the network—or to be contacted—on a per-need basis, meaning that it can stay in sleep mode for minutes, hours or even days.
  Improved coverage—an improvement of 15 dB on LTE-M and of 20 dB on NB-IoT and GSM, which translates into a seven-fold increase in the outdoor coverage area and significantly improved indoor signal penetration to reach deep indoors. This supports many IoT devices like smart meters, which are often placed in a basement. An improved coverage is achieved by time-domain repetitions.
  Support for massive numbers of IoT connections—specifically, one LTE cell site can support millions of IoT devices, depending on the use case. Core network enhancements include software upgrades for service differentiation handling, signaling optimization and high-capacity platforms (more than 30 million devices per node).

In addition to LTE-M (enhanced Machine-Type Communication, MTC), which will deliver a suite of features, as part of Release 13 of the 3GPP standard, to lower power consumption, reduce device complexity/cost, and provide deeper coverage to reach challenging locations (e.g., deep inside buildings), the NB-IoT technology is being standardized for 3GPP Release 13.

NB-IoT (Narrow-Band Internet of Things) provides access to network services using physical layer optimized for very low power consumption (e.g., full carrier bandwidth is 180 kHz, subcarrier spacing can be 3.75 kHz or 15 kHz)—addressing the low throughput IoT applications sometimes referred to as Low Power Wide Area (LPWA). Such applications include smart water/gas metering, municipal light and waste management, livestock breeding and irrigation, and environment monitoring. NB-IoT will provide improved indoor coverage, support of massive number of low-throughput Things, low-delay sensitivity, ultra-low device cost, lower device power consumption, and optimized network architecture. The technology can be deployed in-band, utilizing resource blocks within normal LTE carrier, or in the unused resource blocks within a LTE carrier's guard-band, or standalone for deployments in dedicated spectrum. The technology is also particularly suitable for the refarming of GSM channels.

The NB-IoT technology and the LTE-M rounds out the 3GPP cellular IoT portfolio with various ongoing initiatives that scale cellular technologies to connect a much wider variation of consumer and enterprise use cases. This portfolio of cellular technologies that provide globally standardized, reliable (based on licensed spectrum) solutions meet a rich and varied set of IoT services. Furthermore, these solutions are being designed so that operators can maximally reuse their deployed network infrastructure and will not have to deploy a brand new network to address the IoT market.

Coverage Enhancements for NB-IoT/eMTC

In LTE Rel-13, coverage enhancements will be specified to target Maximum Coupling Loss (MCL) of 155.7 dB. This will provide increased cell coverage area as well as the ability to support MTC devices (eMTC/NB-IoT) in locations with high penetration losses (e.g., smart meters installed in the basement). However, Rel-13 low-complexity devices will have smaller coverage due to reduced capacities, namely 1 Rx (receiving) antenna will lead to approximately 4 dB degradation in performance of the downlink channels. This is due to a lack of receiver combining and diversity gain. Reduced maximum transmit power will lead to a corresponding degradation in coverage of the uplink channels. Reduced UE bandwidth of 1.4 MHz in downlink and uplink can lead to degradation in performance due to a lack of diversity gain. It has been estimated that this results in approximately 1-3 dB loss in performance. In order to reach the targeted 155.7 dB MCL, different channels (UL/DL) require different coverage enhancement amounts, e.g., 18 dB coverage enhancement is need for PUSCH of a Rel-13 low-cost device. In order to achieve the coverage enhancements several coverage enhancement techniques are used.

Some techniques such as relaxing the performance requirements, multiple decoding attempts, and multi-subframe channel estimations do not require specification changes other than to redefine the appropriate performance requirements. Other techniques such as repetition/subframe bundling, overhead reduction, and increasing reference signal density will require standard changes. Note that coverage enhancement will be scalable and configurable, with the aim to minimize the amount of reception and transmission time for each device. A mechanism to identify coverage range will be needed so that the device can be configured for appropriate coverage enhancement amount. For more details, see for example 3GPP RP-141865, "Revised WI: Further LTE Physical Layer Enhancements for MTC" sourced by Ericsson, available at http://www.3gpp.org and incorporated herein by reference.

Notably, coverage enhancements of 15/20 dB for UEs in the Enhanced Coverage mode with respect to their nominal coverage means that the UEs have to be capable of receiving extremely low signal strengths. This applies not only to the initial scanning operation, the cell search and the cell selection operation but also the subsequent communication scheme to be performed by the UE. As described above, there will be different levels of CE depending on the network support and UE capability, e.g., 5/10/15 dB coverage extension.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement. An exemplary implementation of these repeated transmissions prescribes that the same data is transmitted across multiple sub-frames. Yet, it will become immediately apparent that these repeated transmissions will use more resources (time-frequency) than what is required for normal coverage UEs. The transport block size used for transmission to the MTC devices will likely be less than 1000 bits.

Further Enhancements for Wearables

3GPP opened a new study item called "Further enhancements to LTE Device-to-Device, UE to Network Relays for IoT and Wearables" as well as a new work item called "Wearable device using LTE." There is a lot of interest to use LTE technology to connect and manage low cost MTC devices. One important example of such low cost devices is wearables, which also have the benefit of almost always being in close proximity to a smartphone that can serve as a relay.

However, most of the wearable devices connect to the network via a smart phone (e.g., by Bluetooth and/or WiFi), such that they are without control of the operator network. At the same time, it is not a secure data transmission for the consumers since the data from wearable devices are exposed to the smartphone, and also service continuity cannot be guaranteed. There is strong interest in having wearable devices having their own cellular connection capability to ensure they can connect to the network in case there is not smartphone nearby. Thereby, service continuity and management by the Evolved Packet Core network could be supported. The remote UEs thus are known to the network (the remote UE could be identified by its own SIM card).

FIG. 11 illustrates a relay UE and remote UE (e.g., wearable) that are both connected to an eNB. As mentioned before, the relay UE can be typically a smartphone, while the remote UE can be a smart watch, headset, fitness monitor, etc. The possible interfaces are depicted as well. It is assumed that the interface between the relay UE and the eNB is the common LTE-Uu interface, typically available in a smartphone. In a similar manner, remote UEs (also more and more wearables) can also have a direct connection with the eNB through the LTE-Uu interface. On the other hand, a (at least short-range) connection (also called short-range link) is necessary to connect the remote UE and the relay UE. In said respect, a non-3GPP or 3GPP interface is possible. Non-3GPP interfaces that can be implemented are Bluetooth or WiFi. 3GPP interfaces are the Relay (again using the LTE-Uu interface) and the LTE-D2D (PC5 interface).

There are two main aspects to be further enhanced in LTE technology to enable D2D aided wearable and MTC applications (as defined by the Work Item Description found in 3GPP RP-160677):

1. Enhancement of UE-to-Network relaying functionality: The Rel. 13 model limits the ability of the network and the operator to treat the remote UE as a separate device, e.g., for billing or security. UE-to-Network relaying should be enhanced to support end-to-end security through the relay link, service continuity, E2E QoS where possible, efficient operation with multiple remote UEs, and efficient path switching between Uu and D2D air-interfaces. Relaying using D2D can also be based on non-3GPP technologies such as Bluetooth and Wi-Fi. Relaying can enable significant power savings for remote UEs (that are getting their traffic relayed). This is especially true for deep coverage scenarios.
2. Enhancements to enable reliable unicast PC5 link to at least support low power, low rate and low complexity/cost devices. Low cost D2D devices can be enabled by reusing the ideas developed during NB-IoT (Narrow Band—IoT) and eMTC studies, e.g., the NB-IoT/eMTC uplink waveform can be reused for D2D. The current PC5 link design inherited from the broadcast oriented design driven by public safety use cases, represents a bottleneck that prevents low power and reliable D2D communication, due to lack of any link adaptation and feedback mechanisms. Reduced power consumption and low complexity are the key attributes of wearable and MTC use cases that are typically characterized by small form factors and long battery lifetime.

Correspondingly, being at the beginning of a study item, many procedures can be adapted and improved to the usage scenarios.

BRIEF SUMMARY

Non-limiting and exemplary embodiments provide a grouping procedure for grouping a master mobile terminal with a remote mobile terminal. The independent claims provide non-limiting and exemplary embodiments. Advantageous embodiments are subject to the dependent claims.

Correspondingly, in one general first aspect, the techniques disclosed here feature a master mobile terminal for grouping with a remote mobile terminal, wherein the master mobile terminal and the remote mobile terminal are connected to a radio base station in a mobile communication network. The master mobile terminal is capable to serve as a relay respectively for one or more remote mobile terminals so as to relay communication between the one or more remote mobile terminals and the radio base station. A transmitter and receiver of the master mobile terminal discover the remote mobile terminal and an identifier of the remote mobile terminal. The transmitter transmits a group request message to the radio base station, the group request message comprising the remote mobile terminal identifier and a request to group the remote mobile terminal with the master mobile terminal. The receiver receives a group request confirm message from the radio base station, confirming that the remote mobile terminal and the master mobile terminal are grouped together.

Correspondingly, in one general first aspect, the techniques disclosed here feature a remote mobile terminal for grouping with a master mobile terminal. The remote mobile terminal and the master mobile terminal are connected to a radio base station in a mobile communication network. The master mobile terminal is capable to serve as a relay respectively for one or more remote mobile terminals so as to relay communication between the one or more remote mobile terminals and the radio base station. A receiver and transmitter of the remote mobile terminal configured to discover the master mobile terminal and an identifier of the master mobile terminal. The transmitter transmits a group request message to the radio base station, the group request message comprising the master mobile terminal identifier and a request to group the remote mobile terminal with the master mobile terminal. The receiver receives a group request confirm message from the radio base station, confirming that the remote mobile terminal and the master mobile terminal are grouped together.

Correspondingly, in one general first aspect, the techniques disclosed here feature a radio base station for assisting in grouping a remote mobile terminal with a master mobile terminal. The remote mobile terminal and the master mobile terminal are connected to a radio base station in a mobile communication network. The master mobile terminal is capable to serve as a relay respectively for one or more remote mobile terminals so as to relay communication between the one or more remote mobile terminals and the radio base station. A receiver of the radio base station receives a group request message from the master mobile terminal, the group request message comprising an identifier of the remote mobile terminal. A transmitter of the radio base station transmits a group validation request message to an entity of a core network for validating the grouping of the remote mobile terminal with the master mobile terminal. The receiver receives from the entity in the core network a group validation acknowledgment message, confirming that the remote mobile terminal and the master mobile terminal are grouped together. The transmitter transmits a group request confirm message to the master mobile terminal, confirming that the remote mobile terminal and the master mobile terminal are grouped together.

Correspondingly, in one general first aspect, the techniques disclosed here feature a method for grouping a master mobile terminal and a remote mobile terminal, wherein the master mobile terminal and the remote mobile terminal are connected to a radio base station in a mobile communication network. The master mobile terminal is capable to serve as a relay respectively for one or more remote mobile terminals so as to relay communication between the one or more remote mobile terminals and the radio base station. The method comprises the following steps. A discovery between the master mobile terminal and the remote mobile terminal is performed. The master mobile terminal and the remote mobile terminal are grouped, which includes transmitting a group request message from the master mobile terminal or the remote mobile terminal to the radio base station, the group request message identifying the master mobile terminal and the remote mobile terminal and requesting to group the remote mobile terminal with the master mobile terminal. The radio base station informs the remote mobile terminal and the master mobile terminal that they are grouped together.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIGS. 12 and 13 are signaling diagrams for two variants according to an indentation of the first embodiment.

DETAILED DESCRIPTION

Figure 1:
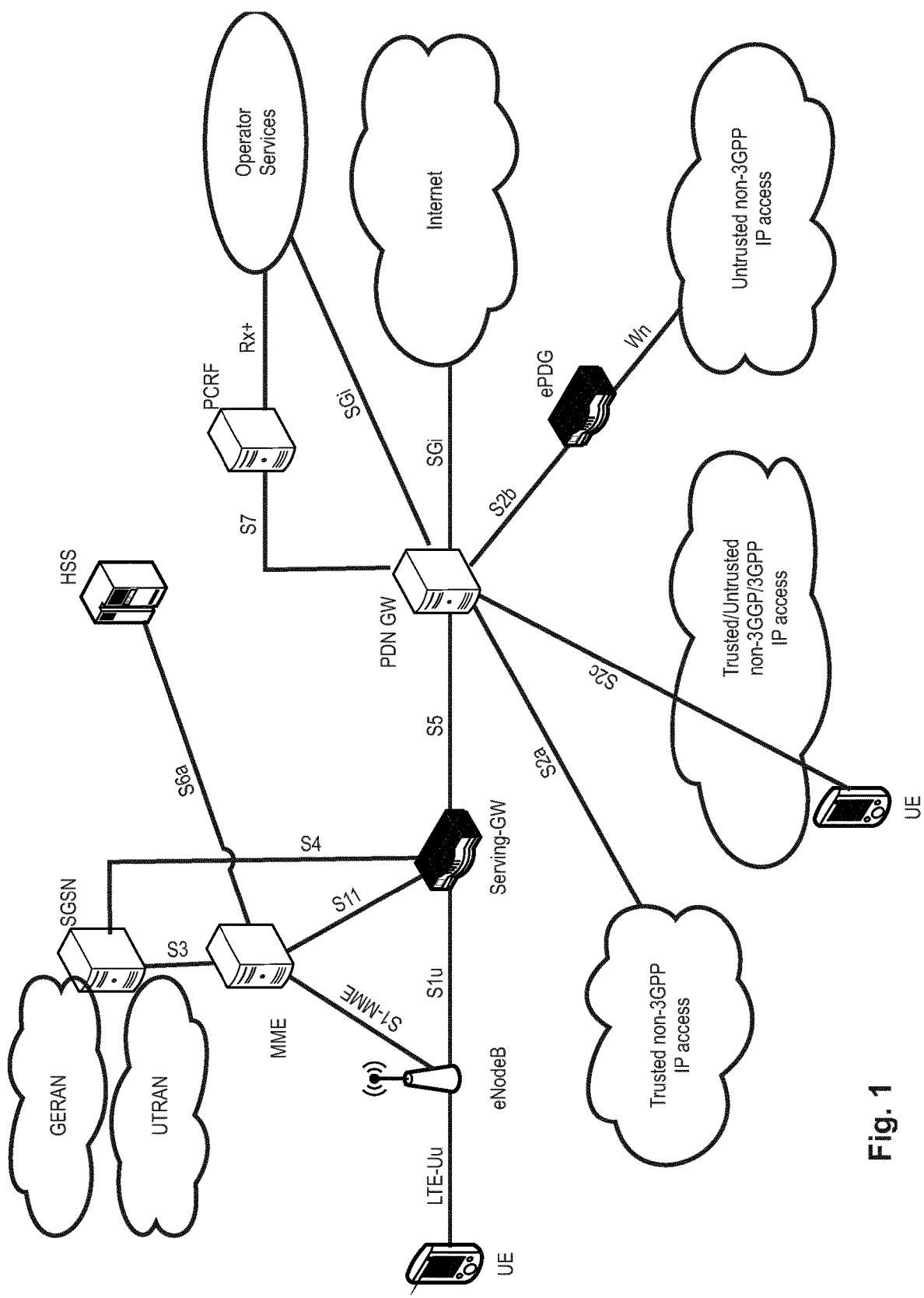
FIG. 1 shows an exemplary architecture of a 3GPP LTE system.
Figure 2:
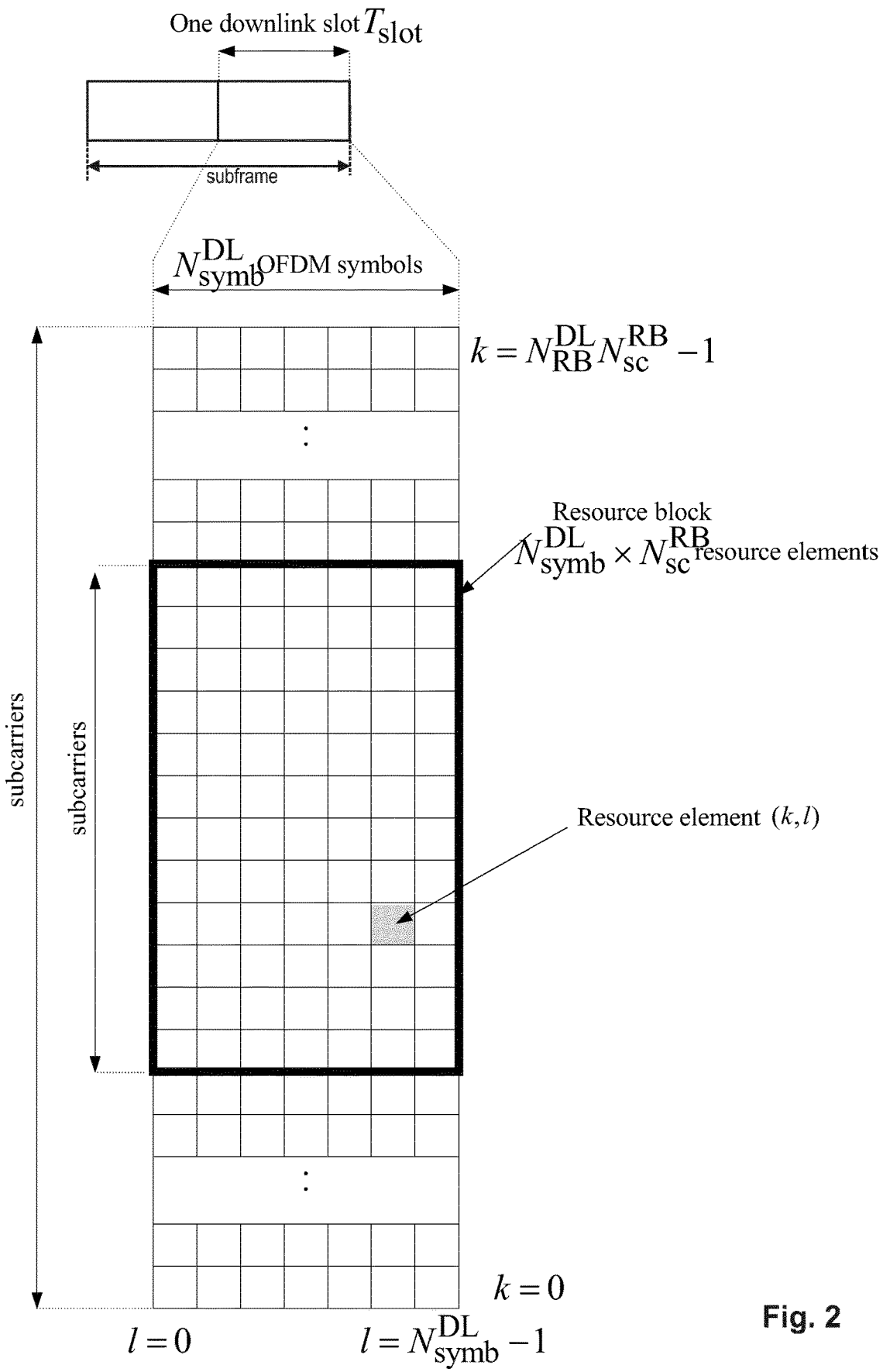
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.
Figure 3:
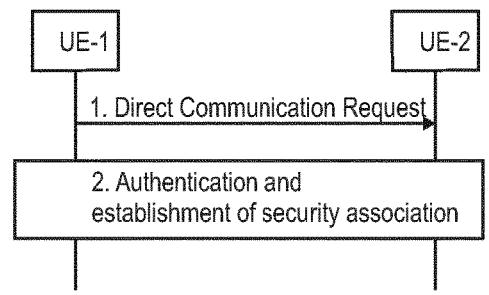
Figure 4:
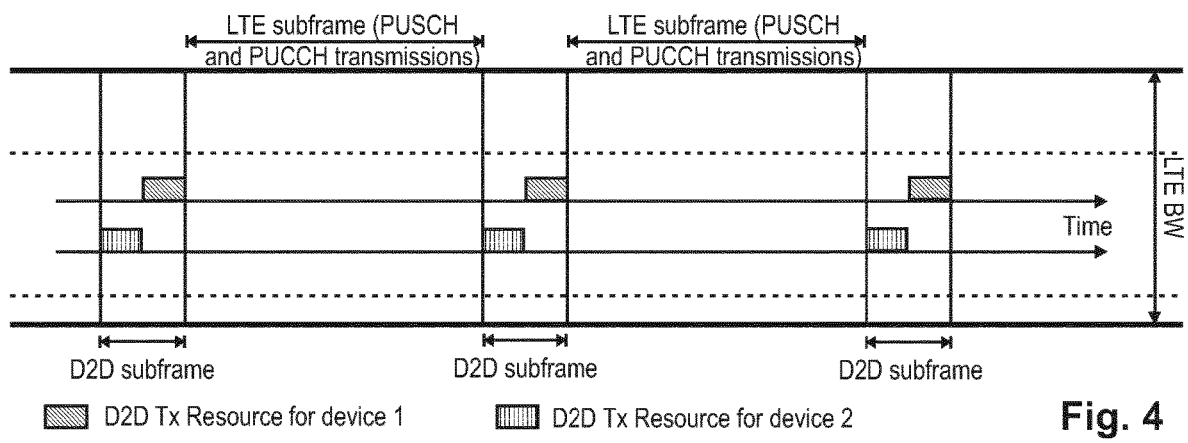
FIG. 4 illustrates the use of transmission/reception resources for overlay (LTE) and underlay (D2D) systems.
Figure 5:
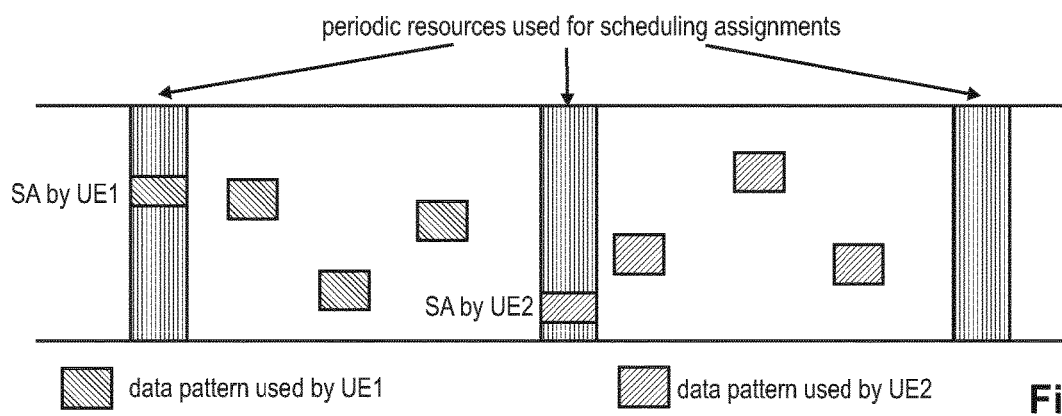
FIG. 5 illustrates the transmission of the Scheduling Assignment and the D2D data for two UEs.
Figure 6:
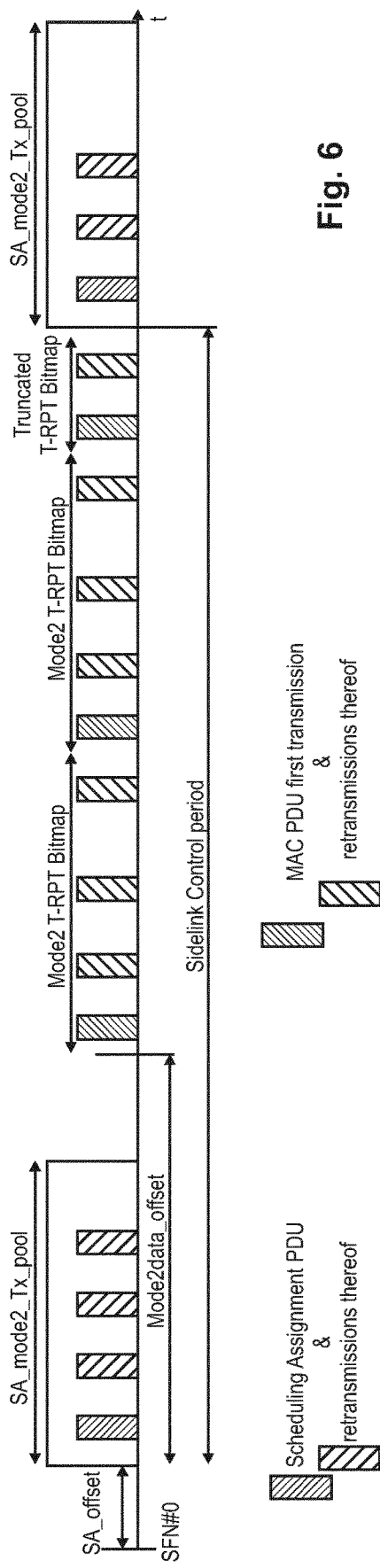
FIG. 6 illustrates the D2D communication timing for the UE-autonomous scheduling Mode 2.
Figure 7:
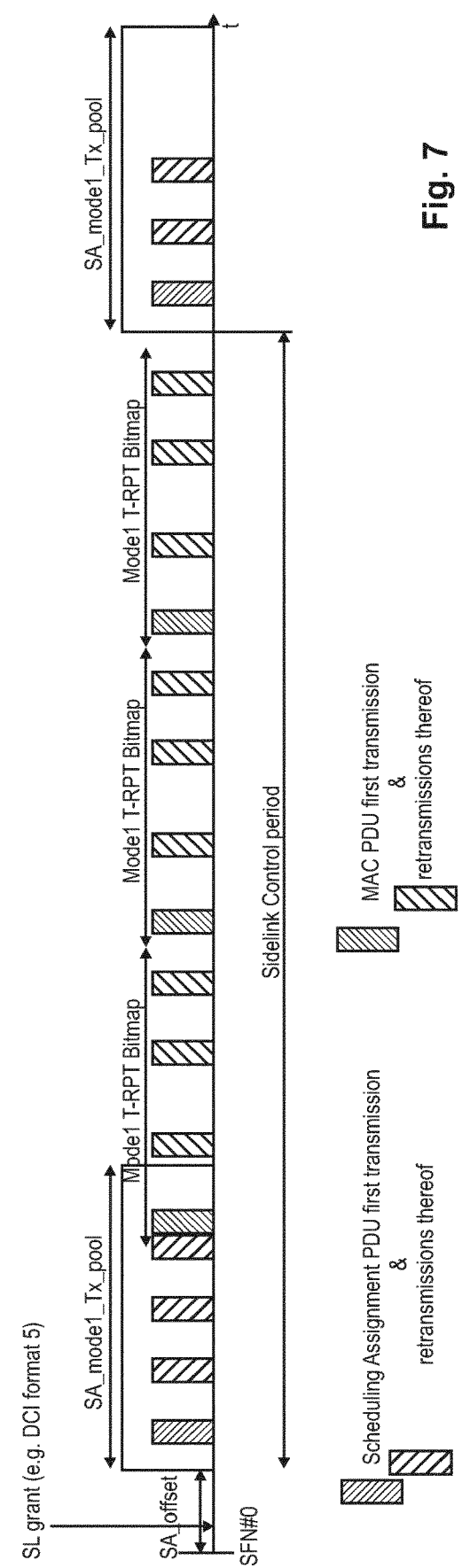
FIG. 7 illustrates the D2D communication timing for the eNB-scheduled scheduling Mode 1.
Figure 8:
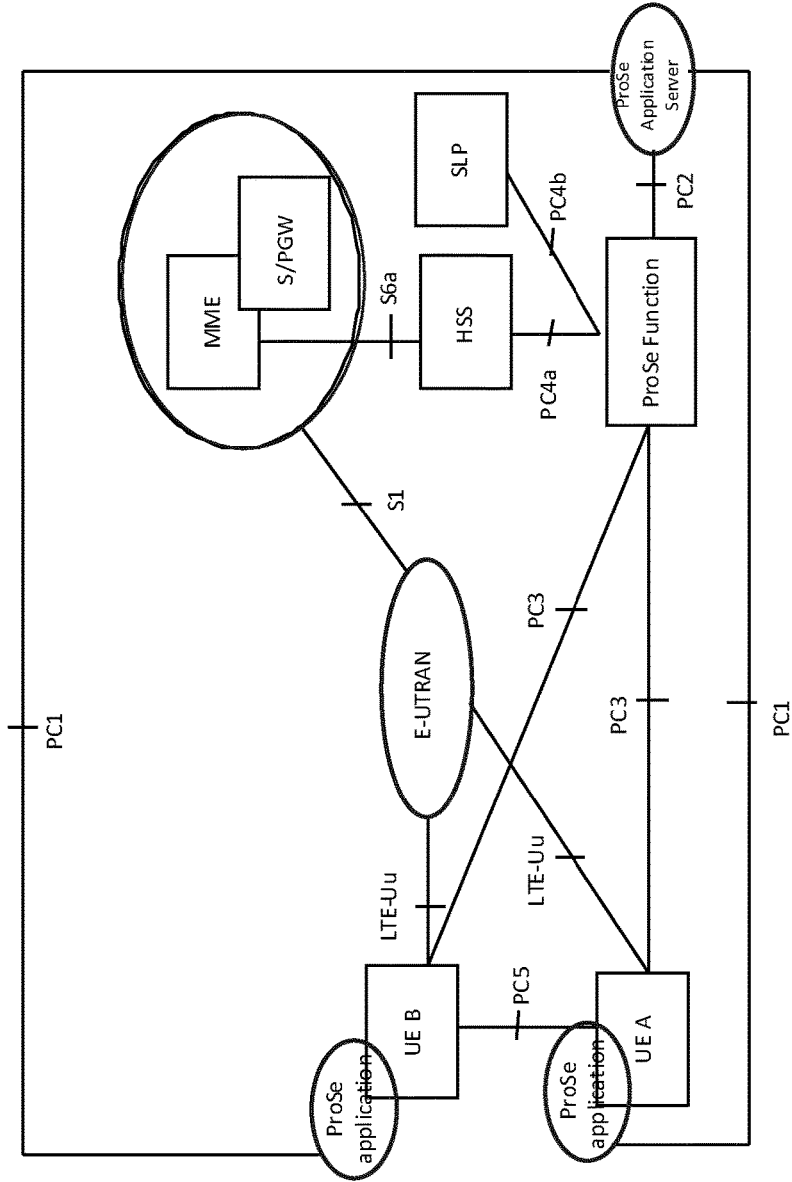
FIG. 8 illustrates an exemplary architecture model for ProSe for a non-roaming scenario.
Figure 9:
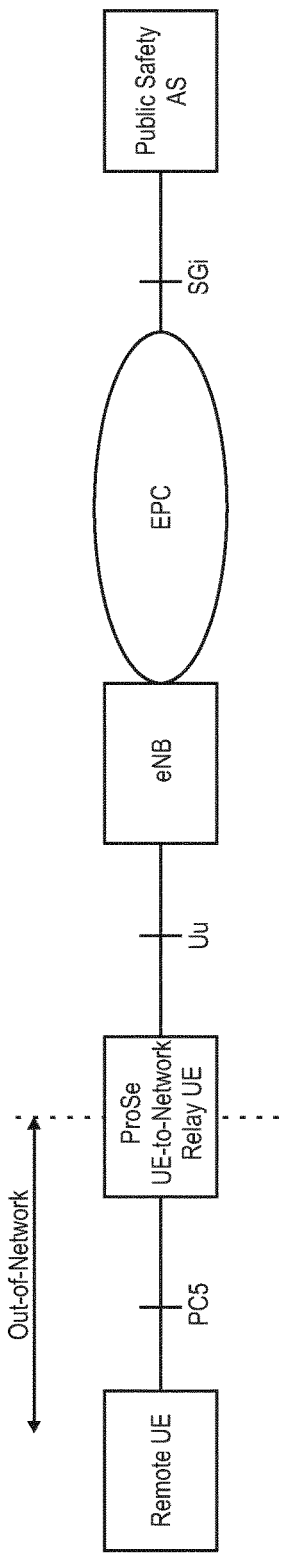
FIG. 9 shows a ProSe UE-to-Network Relay scenario.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the application is to be broadly understood as a transmission directly between two user equipments, i.e., not via the radio base station (e.g., eNB). Correspondingly, the direct communication transmission is performed over a "direct sidelink connection," which is the term used for a connection established directly between two user equipments. For example, in 3GPP the terminology of D2D (Device-to-Device) communication is used or ProSe communication, or a sidelink communication. The term "direct sidelink connection" is to be broadly understood and can be understood in the 3GPP context as the PC5 interface described in the background section.

The term "ProSe" or in its unabbreviated form, "Proximity Services," used in the application is applied in the context of Proximity-based applications and services in the LTE system as exemplarily explained in the background section. Other terminology such as "D2D" is also used in this context to refer to the Device-to-Device communication for the Proximity Services.

The term "remote mobile terminal" as used in the application is to be broadly understood as a mobile terminal that may be of low-complexity, should have high-battery life, high reliability; some of these terminals may however still require high data rates-. For instance, such a remote mobile terminal can be wearable device, or an MTC device. There are various devices and use cases with different requirements, which should be covered too, all in the following focus is on MTC-type wearables, such as smart watches, headphones, health monitors, fitness monitors, tracking devices, remote control, augmented reality, virtual reality, gaming.

The term "master mobile terminal" as used in the application is to be broadly understood as a mobile terminal which is to be grouped together with another mobile terminal (i.e., the remote mobile terminal), and may take over some procedures for the remote mobile terminal thus acting like a master device with respect to the remote mobile terminal. For instance, the master mobile terminal may perform relaying functionality for the remote mobile terminal in the uplink and/or downlink. Correspondingly, the "master mobile terminal" could also be termed "relay mobile terminal."

The term "discovery" or "discover" as used in the application may broadly refer to a process (e.g., the ProSe D2D discovery) that allows one mobile terminal to discover another mobile terminal in its proximity, subsequently allowing the two terminals to connect and communicate with each other.

As explained in the background section, 3GPP has introduced a new study item for enhanced MTC devices and wearable devices for which the LTE framework shall be used. Specific usage scenarios are being assumed, one of which considers a wearable device (e.g., a wristwatch) which is located very close to the smartphone of a user. While most current wearable devices have to rely on the smartphone of the user to connect to the network and/or to use the services provided by the network, there is a growing interest by the market and users to extend the capability of wearable devices such that they will be enabled to directly communicate with the network (eNB, core network) without the smartphone, i.e., as a standalone terminal. However, despite having the cellular connection capability to contact directly with the eNB, the wearable devices are usually located right next to the smartphone and may benefit from this proximity. Correspondingly, this usage scenario presents the opportunity to implement extensions and enhancements to the current LTE framework so as to gain additional advantages.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following various embodiments and implementations. It should be noted that the embodiments may be advantageously used for example in a mobile communication system, such as 3GPP LTE-A (Release 10/11/12/13) communication systems as described in the Technical Background section above (or later releases), but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

The various embodiments mainly provide a grouping procedure between a wearable UE and a master UE. Therefore, other functionality (i.e., functionality not changed by the various embodiments) may remain exactly the same (e.g., as explained in the background section) or may be changed without any consequences to the various embodiments. This includes, e.g., other procedures relating to how the wearable UE and the master UE discover each other (e.g., by LTE ProSe Direct Discovery).

First Embodiment

In the following a first embodiment for solving the above-mentioned problem(s) will be described in detail. Different implementations and variants of the first embodiment will be explained as well.

Figure 11:
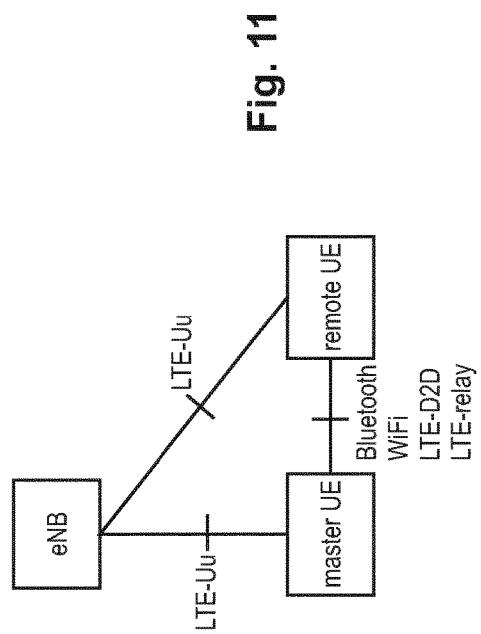
FIG. 11 illustrates the interfaces between a master UE, a remote UE and an eNB.

Exemplarily, a scenario with a wearable UE (W-UE) and a master UE (M-UE) is assumed as generally illustrated in FIG. 11, for example a user having both a smartwatch and a smartphone. The wearable UE is assumed to have capability to establish its own connection with the radio and core network, e.g., the wearable UE has corresponding hardware (e.g., transceiver) and its own SIM/USIM/UICC slot card with corresponding IDs (e.g., IMSI, MSISDN, etc.) to be separately identifiable in the core network. In addition, the wearable UE also has the capability of establishing a short-range connection (e.g., LTE D2D, Bluetooth, WiFi) with the master UE. In turn, in order to gain some specific advantages (explained further below) from the grouping procedure provided by the various implementations of the first embodiment, it is further exemplarily assumed that the master UE is capable to serve as a relay to the wearable UE (e.g., by implementing the LTE ProSe relay capability as explained in detail in the background section) thus being able to forward communication (data and/or control) between the eNB and the wearable UE.

According to a general implementation of the first embodiment, a grouping procedure is performed so as to group the wearable UE and the master UE together. This will be explained in more detail in connection with FIGS. 12 and 13 illustrating two alternative variants of this implementation of the first embodiment. As apparent therefrom, the grouping may be initiated by either the wearable UE (W-UE1 in FIG. 13) or the master UE (M-UE in FIG. 12).

It is assumed that the master UE and W-UE have discovered each other (e.g., ProSe direct discovery or WiFi discovery) so that both UEs know that they are in proximity of each other and have also discovered the respective identity of each other. Mainly, ProSe direct discovery is currently intended such that the two UEs can perform ProSe direct discovery according to any of the variants explained in the background section. However, also a different discovery procedure (e.g., non-3GPP such as WiFi discovery) is possible in the context of the first embodiment.

Then, a short-range connection via the PC5 interface may be established between the two UEs over which data may be exchanged. Again, an LTE ProSe (D2D) connection, as explained exemplarily in the background section, is mainly envisioned for this PC5 connection, although the short-range connection between the M-UE and the W-UE can instead or in addition be implemented by using non-3GPP technology such as Bluetooth or WiFi; as a further alternative the usual LTE-Uu technology used for the relay operation can be used.

In any case, the M-UE and the W-UE have discovered each other, and then either one may initiate the grouping procedure by transmitting a suitable message to the eNB (exemplarily termed in the following grouping announcement message). For example, the grouping procedure could be implemented as an RRC procedure, and the messages exchanged in said respect are then also RRC messages, either new ones or based on existing RRC messages. The grouping announcement message shall request the eNodeB to confirm the grouping of the W-UE and the M-UE and correspondingly shall identify to the eNodeB both UEs that are going to be part of the requested group. On the one hand, the eNodeB could confirm the grouping of the wearable UE and the master UE on its own (not shown in FIG. 12, 13). Both the wearable UE and the master UE shall be informed that the grouping was confirmed by the eNodeB. For instance, the eNodeB might return a grouping confirmation message back to the UE having initiated the grouping (the master UE or the wearable UE) confirming the grouping, wherein the UE receiving the confirmation is then responsible to inform the other UE about the successful grouping (for instance by transmitting a corresponding message over the short-range connection of the PC5 interface as illustrated in FIGS. 12 and 13. Alternatively, the eNodeB, confirming the grouping, might be the responsible entity for informing both UEs about the successful grouping (not shown in figures).

In another implementation of the first embodiment, the eNodeB might not conduct the confirmation, in which case the eNB validates the grouping with a corresponding entity in the core network such as an MME (Mobility Management Entity) which can perform queries to the HSS (Home Subscriber Server) and/or the HLR (Home Location Register) as given in Section 6 of 3gpp TS 33.401 v 13.1.0 incorporated herein by reference. In said respect, the eNodeB shall transmit a group validation message to the responsible entity in the core network (see FIGS. 12 and 13), wherein the group validation message identifies the master UE as well as the wearable UE by, e.g., explicitly including their IDs (e.g., IMSIs) in the message. Alternatively, the initiator of the procedure (either the Master UE or the Remote UE) need not be identified separately in the validation message since it can be identified based on the Uu and S1 connection being used for said transmission procedure. For instance, this can be done using what is called "UE-associated logical S1-connection": The UE-associated logical S1-connection uses the identities WE UE S1AP ID and eNB UE S1AP ID according to definition in TS 23.401. For a received UE associated S1-AP message the MME identifies the associated UE based on the WE UE S1AP ID IE and the eNB identifies the associated UE based on the eNB UE S1AP ID IE. The UE-associated logical S1-connection may exist before the S1 UE context is setup in eNB.

The core network may then determine whether or not these two UEs may form a group (i.e., are authorized to form a group). For instance, in order to allow a group, the two UEs might have to be registered to the same user (same person or alternatively same family/company, etc.), so as to avoid that a wearable UE is grouped without being previously authorized (e.g., wearable UE of one person being grouped with a particular smartphone of a stranger) and thus endangering his data security and integrity.

Once having determined whether or not to authorize the grouping, the responsible entity in the core network responds to the eNB, e.g., with a grouping Ack (acknowledgement) message or a grouping Nack (negative-acknowledgement) message. In turn, the eNB can then transmit the grouping confirmation message (assuming that the grouping was successful) as explained above or a grouping reject message (assuming that the grouping was not successful), i.e., to either only the UE initiating the grouping (which in turn takes care to inform the other UE via the short-range connection) or to both UEs. In any case, both UEs, the eNB as well as the core network know about the successful grouping of the W-UE and the M-UE. This association between the W-UE and the M-UE can then be exploited for various different procedures that can be shared/distributed between the W-UE and the M-UE, as will be explained in more detail below.

As apparent from FIGS. 12 and 13, the messages of the grouping procedure include the IMSI of the master UE and/or the wearable UE. However, it might not be necessary to separately include the IDs (e.g., IMSI) of the 2 UEs in case the entities may be derived otherwise by the receiving entity (e.g., from the source address used when generating a message). For instance, in FIG. 13 the grouping confirm message transmitted by the eNodeB to the wearable UE only comprises the IMSI of the master UE, instead of the IDs of both UEs forming the group. Similarly, the grouping confirm and Ack (or Nack) messages (exchanged between the different entities, CN, core network, the eNB, M-UE and W-UE1) are shown to include the IMSIs of the M-UE and/or the W-UE. However, it might not be necessary to include one or both of the IDs in the grouping confirm messages, as long as it is clear to the eNB, M-UE, and W-UE1 which particular grouping is confirmed by the grouping confirm message. For instance, if only the W-UE and the M-UE are forming a group, the grouping confirm messages do not have to include one or both IDs of the resulting group. On the other hand, if several wearable devices exist which want to be grouped with the M-UE, the grouping announcement would already include IDs of the various W-UEs, and the validation by the core network might result in different authorizations for the various W-UEs, such that the grouping (N)ACK and grouping confirm messages would distinguish between the various W-UEs by including the W-UE ID for each W-UE that was authorized to join the group with the M-UE. In another option, instead of identifying the authorized W-UE(s) by their IDs (e.g., IMSIs) an index may be used to unambiguously identify that W-UE listed in the grouping announcement message and/or the grouping validation message that is authorized to join the group with the M-UE.

As apparent from FIGS. 12 and 13, for the above-explained implementation it is assumed that the W-UE is identified by its IMSI. First of all, any other NAS-identity (such as TMSI) can be used instead. Furthermore, how the W-UE is identified in the different messages exchanged between the W-UE, M-UE, eNB and core network also depends on whether the W-UE is already in RRC Connected state or not. In particular, a UE that is in RRC Connected state has already been assigned a C-RNTI (Cell-Radio Network Temporary Identifier), which could be used instead of or in addition to the IMSI in order to identify the W-UE and/or M-UE for the eNB; however, the M-UE and W-UE shall continue to be identified to entities in the core network by using their NAS identity such as the IMSI, GUTI (Globally Unique Temporary Identity) or S-TMSI or M-TMSI or IMEI. In the following, the IMSI is mainly used as an example to represent the NAS identity.

Figure 14:
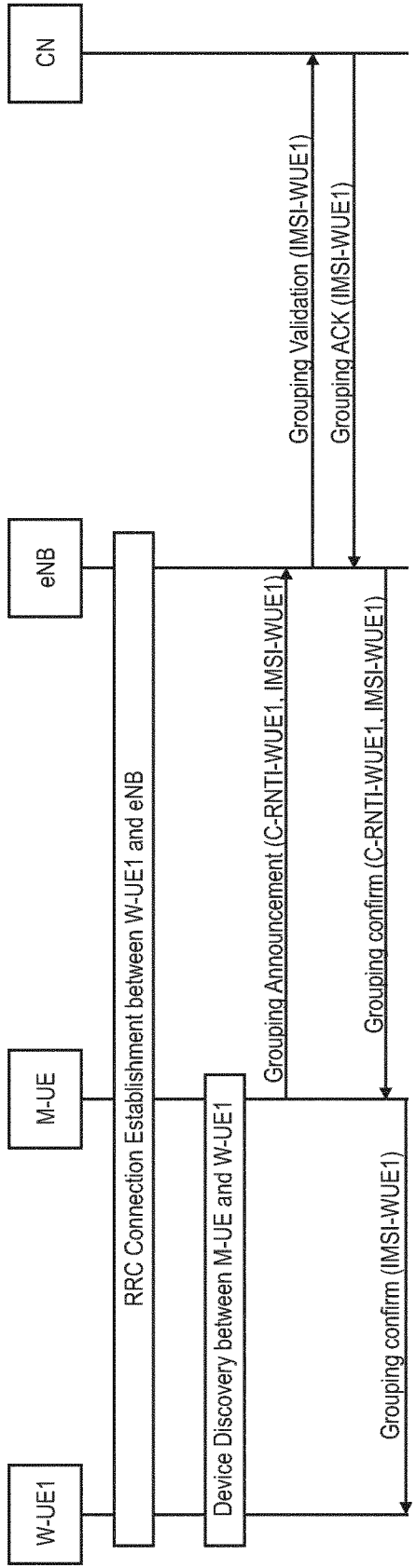
FIGS. 14 and 15 are signaling diagrams for further implementations of the first embodiment, further including an RRC connection establishment procedure.

In one option, the W-UE may have already performed a usual RRC Connection Establishment procedure with the eNB before the grouping procedure is actually started. FIG. 14, which is based on FIG. 12, exemplarily assumes that the W-UE1 is already connected to the network before the direct device discovery is performed between the M-UE and W-UE1. Alternatively, the W-UE1 may perform the RRC Connection Establishment procedure after the discovery procedure. Correspondingly, the M-UE will learn both the C-RNTI and IMSI of the W-UE1 during the discovery procedure, and the grouping announcement message transmitted by the M-UE may additionally (or instead of the IMSI) include the C-RNTI of the W-UE1 (FIG. 14 exemplarily assumes that both IDs are transmitted in the grouping announcement message to the eNB).

Figure 15:
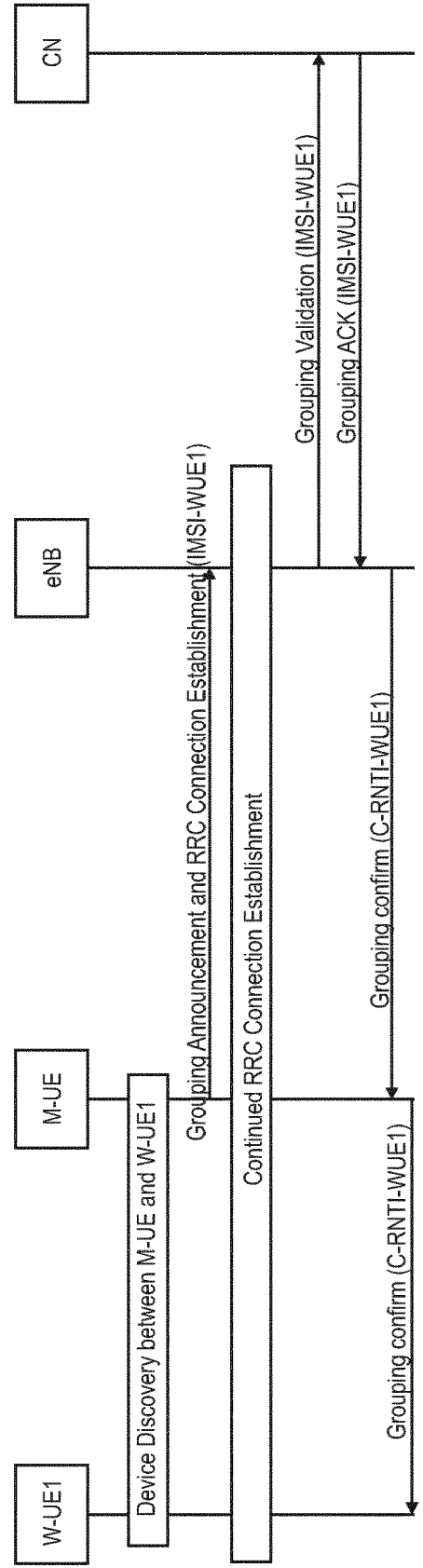

On the other hand, the W-UE may not have already performed an RRC Connection Establishment procedure before. According to a further implementation of the first embodiment, the grouping procedure can be combined with the RRC Connection Establishment procedure usually performed between the W-UE and the eNB. For example, the grouping announcement message explained above can be combined with one of the messages from the RRC Connection Establishment procedure, such as the RRC Connection Request message, e.g., using some IEs of the RRC Connection Request message like UE Id and Establishment Cause in the Group announcement Request. For instance, in case the M-UE is initiating the grouping, it may thus also initiate the RRC connection on behalf of the W-UE, such that the W-UE does not need to be provided with radio resources in said respect. This is conceptually illustrated in FIG. 15 which assumes that the eNB, upon receiving the grouping announcement message (also initiating the RRC Connection Establishment) continues the RRC Connection Establishment with the W-UE. Alternatively, the M-UE may be acting on behalf of the W-UE, in which case, since the timing advance required or applicable would be same or nearly the same between the wearable and the master UE, there is no particular reason to have the RACH procedure being repeated to obtain the C-RNTI from the eNB for the Wearable UE. In particular, a C-RNTI is generated and assigned by the eNB for the W-UE. Alternatively, the C-RNTI assigned to the W-UE during the RRC Connection Establishment could then, e.g., be provided together with the group confirmation message to the W-UE, as shown in FIG. 15.

The combining of the RRC connection establishment procedure with the grouping procedure obviates the need for the W-UE to perform the RACH procedure and thereby the W-UE battery is saved since it does not need to transmit RACH Preamble, receive RAR (Random Access Response) and might not even need to read the System Information itself since same can be forwarded to it from the Master UE. This is possible since the TA (timing advance) likely applicable can be exactly (or sufficiently nearly) the same as that of the M-UE. In addition the combining helps the W-UE battery by not mandating it to send the RRC Connection Request, RRC Connection Setup Complete messages. Also, the reception of RRC Connection Setup can be substituted by the message reception in M-UE (e.g., grouping confirm) on W-UE's behalf.

In a further variant thereof, the RRC Connection Establishment procedure may optionally be followed by a Security establishment between the W-UE and the eNB. The Security establishment procedure is performed so as to cipher and integrity protect the data transmission and reception between a UE and the network. Said group message can itself act as a trigger for the network to initiate the security procedure with the W-UE. For the security procedure related messages like Identity Request, Security Mode Command and so on, these could either be directly exchanged between the W-UE and the network (eNB and CN for AS and NAS security messages respectively) or these messages can be exchanged with the M-UE acting on behalf of the W-UE. The key derivation parameters like NH and NCC can be exchanged between the W-UE and the M-UE on the secured PC5 link.

In the following more specific implementations of the first embodiment will be explained.

In order to further improve the first embodiment, the discovery procedure between the wearable UE and the master UE shall only be performed when the two UEs are in proximity of each other so as to avoid that the two UEs are constantly performing direct discovery in vain due to the two UEs not being near to each other. Correspondingly, the location of the two UEs may be monitored, e.g., by an entity of the core network, such that, when the two UEs are near to each other, this entity can transmit proximity information to the two UEs in order to inform them about each other's proximity. Upon receiving such information, the two UEs can then start the direct discovery to discover each other and establish a suitable connection in between them.

Figure 16:
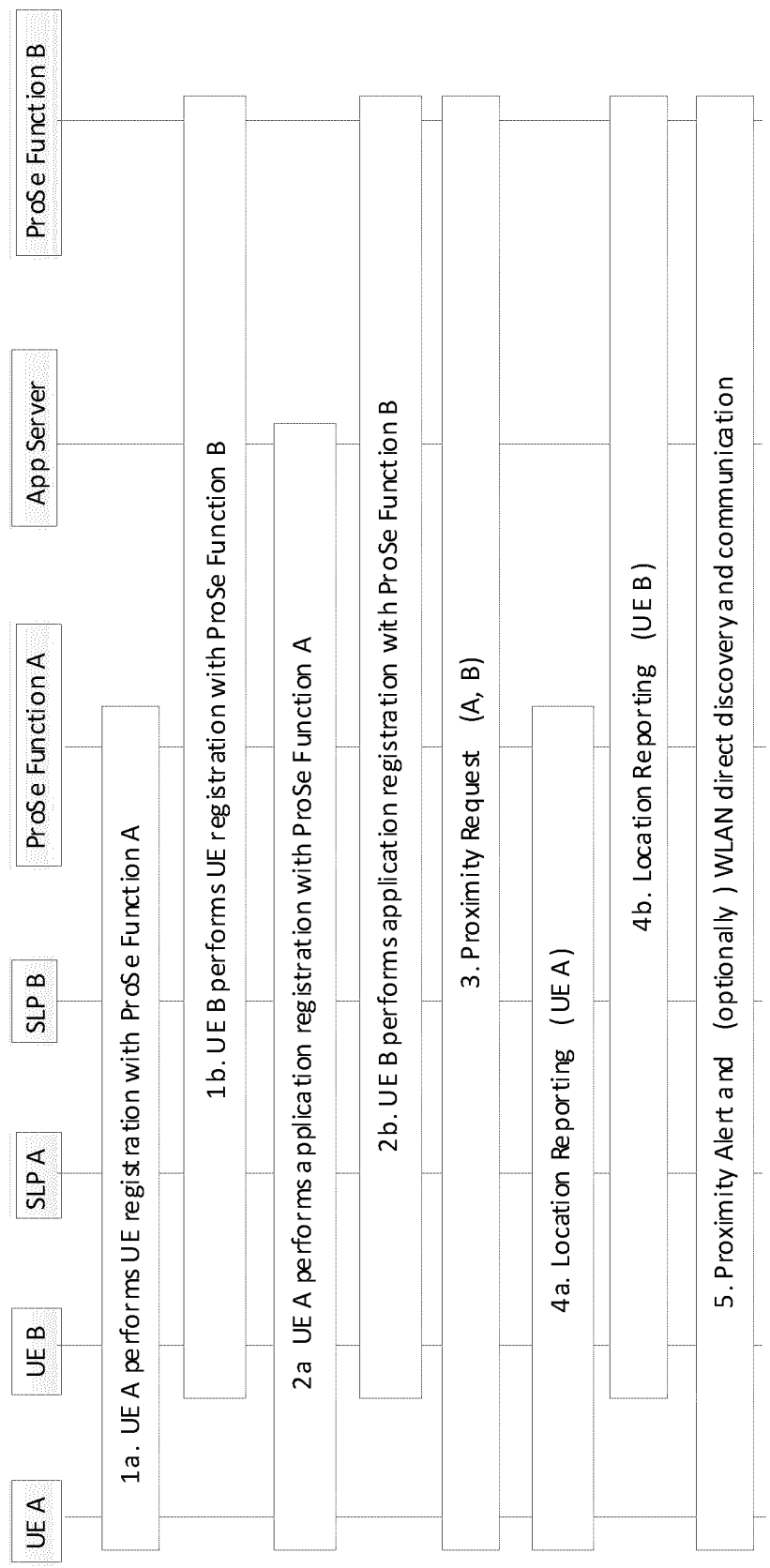
FIG. 16 is an overview diagram for an EPC direct discovery procedure.

In particular, the ProSe discovery procedure currently standardized in 3GPP provides such a suitable mechanism to alert the two UEs about each other. In particular, 3GPP standard 23.303 v13.3.0 in its section 5.5.1, incorporated herein by reference, discloses how a proximity request can be used by a UE in order to be alerted when it enters proximity with another UE (see section 5.5.5 "Proximity Request"). FIG. 16 discloses the overall call flow for the ProSe discovery, comprising the following steps summarized in the following but explained in detail in the corresponding sections of the 3GPP standard 23.303, respectively incorporated herein by reference.

1. UEs perform UE registration for ProSe with the ProSe Function residing in their respective Home PLMNs;
2. UEs perform application registration for ProSe with the ProSe Function residing in their respective Home PLMNs;
3. UE A makes a proximity request for UE B, i.e., requests that it be alerted for proximity with UE B (possibly indicating a window of time during which the request is valid). In response, ProSe Function A requests location updates for UE A and UE B. These location updates can be periodic, based on a trigger, or a combination of both. To request location updates for UE A, ProSe Function A contacts SUPL Location Platform (SLP) A. To request location updates for UE B, ProSe Function A contacts ProSe Function B, which requests location updates for UE B from SLP B;
4. The UEs' locations are reported to their respective ProSe Functions intermittently. ProSe Function B forwards UE B's location updates to ProSe Function A based on the conditions set by ProSe Function A. Whenever ProSe Function A receives location updates for UE A and/or UE B, it performs proximity analysis on UE A and UE B's locations;
5. When ProSe Function A detects that the UEs are in proximity, it informs UE A that UE B is in proximity and (optionally) provides UE A with assistance information for WLAN direct discovery and communication with UE B. ProSe Function A also informs ProSe Function B, which in turn informs UE B of the detected proximity and (optionally) provides UE B with assistance information for WLAN direct discovery and communication with UE A.

According to a specific implementation of the first embodiment, the direct device discovery as explained before can be performed between the two UEs after respectively receiving the proximity alert as explained in the above overview.

In the broad implementation of the first embodiment explained above, it was simply assumed without going into further detail that the grouping procedure is initiated at some point after discovery happened between the two UEs. Indeed, a successful discovery (and/or the successful establishment of a short-range connection) between the two UEs can be used as a trigger to initiate the grouping procedure. On the other hand, so as to expedite the whole procedure a further implementation of the first embodiment provides that the grouping procedure could also be triggered by the proximity alert (mentioned above) such that the discovery procedure and the grouping procedure are initiated at about the same time and may be performed in parallel.

According to further implementations of the first embodiment the grouping procedure could also be initiated based on another trigger. For instance, the grouping procedure could be application-specific such that when the wearable UE has data to transmit for a specific application or service, the grouping procedure is triggered, so as to then be able to take advantage of the relay functionality provided by the master UE, e.g., to transmit the uplink data for this specific application/service via the short-range connection to the master UE so as to be further relayed by the master UE to the eNodeB. In this respect, in case the master UE is the entity initiating the grouping procedure, the wearable UE shall inform the master UE about the pending data for the specific application/service which then in turn triggers the master UE to perform and initiate the grouping procedure.

There may be also further conditions that may be used as a trigger for initiating the grouping procedure. For instance, the wearable UE may monitor its power/battery and, in case the power/battery falls below a predetermined threshold, the grouping procedure may be initiated in order to consume less power (e.g., by relaying uplink and/or downlink data via the master UE).

Figure 17:
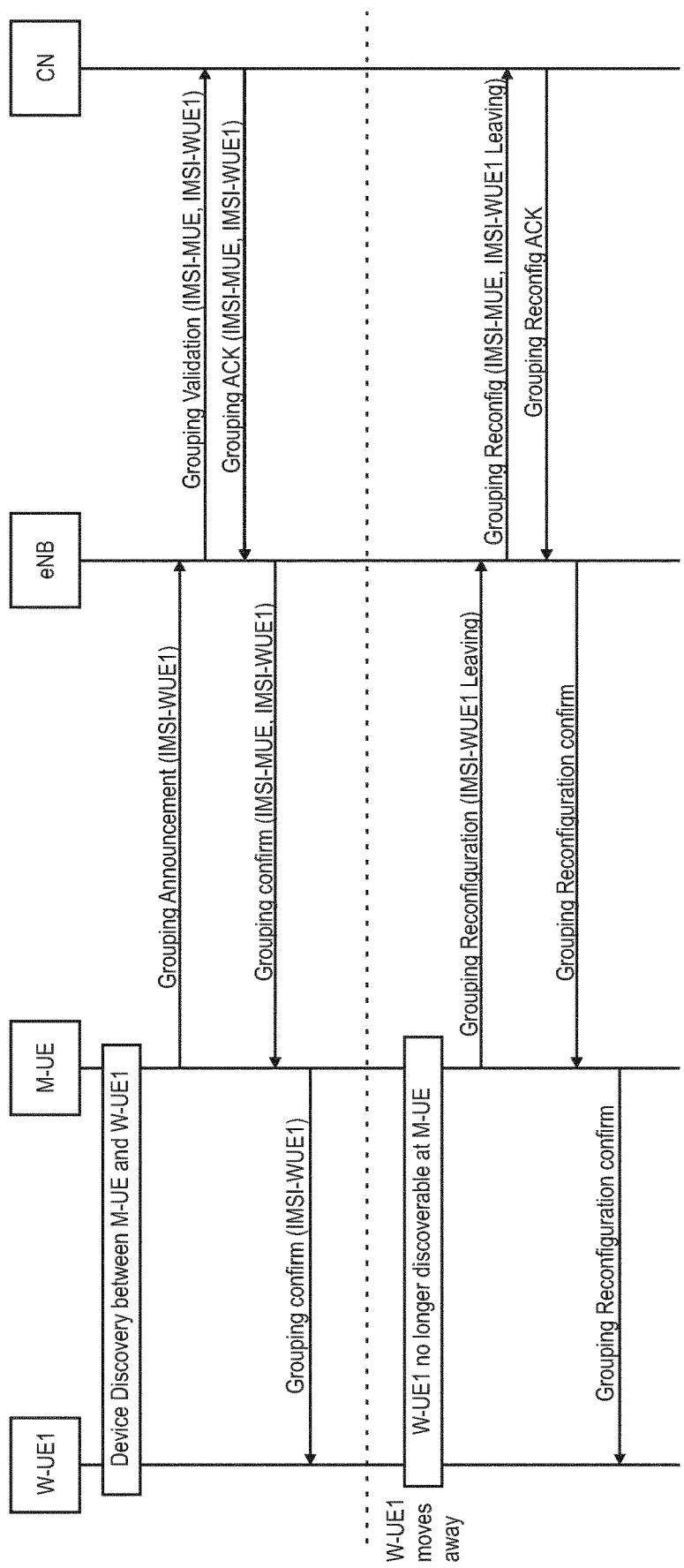
FIG. 17 is a signaling diagram for a further implementation of the first embodiment, including grouping reconfiguration procedure.

Further implementations of the first embodiment focus on how the group may be reconfigured, e.g., when the wearable UE wants to leave the group. FIG. 17 illustrates a signaling exchange in said respect in the bottom part, wherein the upper part is based on FIG. 12. It is assumed that the W-UE1 is to leave the group which could have several reasons. For instance, the W-UE1 might move away and thus leaves the proximity of the M-UE, such that it is no longer discoverable by the M-UE. Or, the wearable UE has no more data to transmit for the specific application/service for which the grouping procedure was initiated. In a further option, the battery/power of the wearable UE is larger than the previously discussed predetermined threshold such that a grouping with the master UE is no longer necessary to save battery/power.

Any of these reasons or other reasons may lead to the decision that the wearable UE leaves the group previously established with the master UE. A group reconfiguration procedure can be initiated in said respect to have the wearable UE no longer grouped together with the master UE. In FIG. 17 it is exemplarily assumed that the master UE, which previously initiated the grouping procedure, is also responsible for initiating the grouping reconfiguration. Correspondingly, it may initiate the grouping reconfiguration, e.g., upon determining that the wearable UE is no longer in the proximity, or upon a particular indication from the wearable UE requesting to leave the group. In a further alternative, keep alive messages could be exchanged between the wearable UE and the master UE as long as the grouping should remain active. Consequently, the wearable UE might stop transmitting the keep-alive messages as soon as it decides to leave the group. Also, when the wearable UE moves away from the master UE, the master UE will no longer receive the keep-alive messages and will thus determine that the wearable UE shall leave the group.

The grouping reconfiguration message is transmitted from the master UE to the eNodeB, identifying the wearable UE that is to leave the group, e.g., by including the IMSI of the wearable UE. In line with the grouping procedure in the upper part of FIG. 17, the group reconfiguration has to be also synchronized with the core network which authorized the grouping in the first place. In this case however, the grouping reconfiguration message transmitted from the eNodeB to the core network (e.g., the MME) need not have the purpose of authorizing the group reconfiguration but rather may only serve to provide the core network with the information that the identified wearable UE is no longer grouped together with the master UE, i.e., no authorization is necessary. The core network may acknowledge the grouping reconfiguration by transmitting a corresponding grouping reconfiguration acknowledgment message back to the eNodeB. This grouping reconfiguration acknowledge message may but need not include the IDs of the master and/or wearable UE, since the eNodeB will know for which grouping reconfiguration message the acknowledgment is intended. The grouping reconfiguration is then confirmed to both the master UE and the wearable UE. Although in FIG. 17 the grouping reconfiguration confirmation is transmitted by the eNodeB after receiving the grouping reconfiguration acknowledgment from the core network, the grouping reconfiguration configuration message may also be transmitted to the master UE before, because the eNodeB does not have to wait for the acknowledgment from the core network (in contrast to the authorization in the grouping procedure above).

In the previously described implementations of the first embodiment, the grouping announcement message was described as only including the identities of the UEs that shall form the group. However, further implementations of the first embodiment extend the content of the grouping announcement message to include further information that could be useful for the grouping procedure and subsequent use of the established group.

For example, the grouping announcement message may include information on the capabilities of the wearable UE, such as the transmission capability (e.g., number of antennas, supported transmission modes, or any other capabilities related to RF, physical layer or upper layers as described in PhyLayerParameters and rf-Parameters in UE-EUTRA-Capability of 36.331 v 13.0.0). This information could later be used by the eNB to determine how to best schedule radio resources to the M-UE and W-UE.

Furthermore, the grouping announcement message may also be used to carry a request to be scheduled radio resources like IE SL-CommTxResourceReq or discTxResourceReq or the resource requests contained inside SidelinkUEInformation-v13x0 of the SidelinkUEInformation message of 3GPP TS 36.331 v13.0.0 for data communication over the short-range connection. Consequently, the eNB would receive the grouping announcement message, including the radio resource request, and might then in response schedule suitable radio resources to the W-UE and/or M-UE. A corresponding grant is then transmitted to the M-UE and/or the W-UE, e.g., in the group confirm message or in the RRC Connection Reconfiguration similar to SL-DiscConfig and SL-CommConfig.

Furthermore, the grouping announcement message may also comprise information on applications and/or services for which the data should be relayed via the master UE, instead of directly to the wearable UE. Correspondingly, the eNodeB knowing about it these applications/services will adapt the scheduling of uplink and downlink data accordingly such that corresponding data for these indicated applications/services is relayed via the master UE.

In the following implementations of the first embodiment, a preauthorization procedure is performed for the grouping in order to expedite the actual grouping procedure to be performed later. A corresponding exemplary signaling diagram is provided in FIG. 18. In more detail, assuming that the master UE is the entity to initiate the grouping procedure, also the preauthorization procedure may be initiated by the master UE on behalf of the wearable UE, by transmitting a suitable grouping preauthorization message to the eNodeB identifying the wearable UE and the master UE to later potentially form the group. The eNodeB in turn transmits a suitable grouping preauthorization request to the responsible entity in the core network (as discussed above, e.g., the MME) which may then in a similar manner as discussed before determine whether or not to allow/authorize a grouping of the wearable UE and the master UE. The core network may thus respond with a suitable grouping preauthorization ACK or NACK message to the eNodeB depending on the result. There are different variations on how the preauthorization procedure may continue. One option assumes that it suffices that the eNodeB knows about the preauthorization, such that later, when eNodeB receives the actual grouping announcement message from the master UE requesting to form the group with the wearable UE, the eNodeB does not have to again validate the grouping with the core network.

Figure 18:
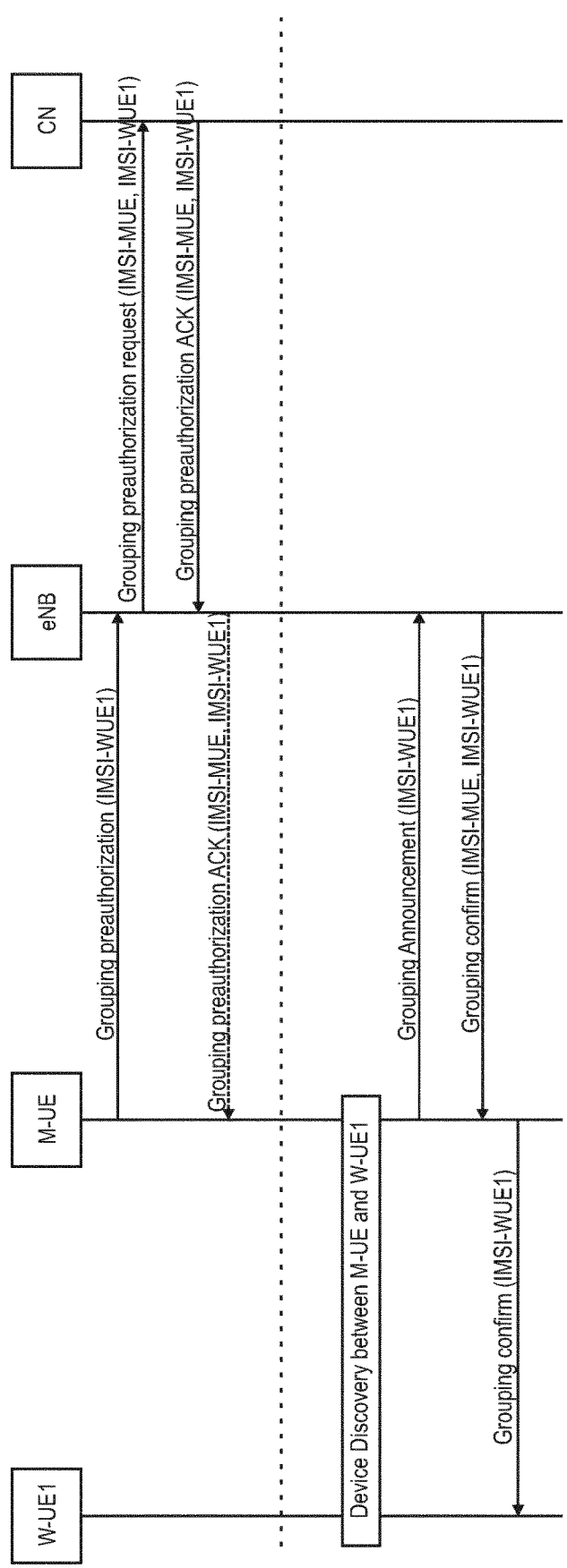
FIG. 18 is a signaling diagram for a further implementation of the first embodiment, including a grouping preauthorization procedure.

As apparent from FIG. 18, the eNodeB may immediately respond to the grouping announcement by returning a grouping confirmation message to the master UE. Correspondingly by using this preauthorization procedure it is possible to significantly expedite the grouping procedure.

Alternatively (not shown in FIG. 18), the eNodeB might still have to validate the requested grouping with the core network by transmitting a corresponding group validation message. However, since the core network (e.g., the MME) already performed a preauthorization, it may have contacted the HSS/HLR to validate the subscription and the grouping subscription of the devices being grouped together. Such preauthorization would obviate the need for HSS/HLR queries later when the grouping actually needs to be carried out. Such preauthorization might already initiate the Security procedures (like Identity request, Authentication, Security Mode Command) with the UE before the grouping was actually initiated or in parallel to the grouping procedure.

Furthermore, FIG. 18 shows the grouping preauthorization acknowledgment message between the eNodeB and the master UE with dashed arrow so as to thereby indicating that this message is optional.

Although not shown in FIG. 18, the grouping preauthorization procedure may also be initiated by the wearable UE.

The grouping preauthorization procedure may be initiated, e.g., when either the wearable UE and/or the master UE register in the network, e.g., for using the ProSe services (see step 1a, 1b of FIG. 16). Alternatively, the grouping preauthorization procedure may be initiated when the master/wearable UE registers for being alerted when the other UE is in its proximity (see step 3 in FIG. 16). For instance, the grouping preauthorization messages may be combined with those messages transmitted with regard to this proximity alert procedure conducted between the wearable/master UE and the core network. To enable this, one or some of the proximity messages will contain an explicit indication about the intention of the initiating device to be grouped with a target device, e.g., using the target device's identity like S-TMSI if available or IMEI. In response to this, the MME may initiate the security procedures with the UE and/or the HSS/HLR to validate the subscription and the grouping subscription of the devices being grouped together. Such preauthorization would obviate the need for HSS/HLR query later when the grouping actually needs to be carried out. Such preauthorization might already initiate the Security procedures (like Identity request, Authentication, Security Mode Command) with the UE before the grouping was actually initiated or in parallel to the grouping procedure.

In the above, various different implementations of the first embodiment on how to implement the grouping procedure of the first embodiment have been explained. The following description focuses on how the resulting grouping of the master UE and the wearable UE can be used for other procedures in the system. Generally, it is assumed that wearable devices need to have an extremely long battery life, while the smartphones (i.e., master UEs) should have higher capabilities in terms of RF, HARQ and buffering requirements, etc. Consequently, in order to save battery in the wearable UE while exploiting the higher capability of the smart phones for the wearable UE, particular procedures normally having to be performed by the wearable UE can be shared/taken over by the master UE.

For example, the scheduling procedure for the uplink and/or the downlink communication of the wearable UE can be changed so as to be performed by the master UE on behalf of the wearable UE. This can be implemented in different ways some of which will be explained in the following. In order to save as much battery as possible, the uplink data and/or control transmissions (PUSCH/PUCCH) to be performed by the wearable UE shall be relayed by the master UE instead of transmitting same directly to the eNodeB. This allows to save transmission power since the uplink data/control information is only to be transmitted via the short-range connection to the master UE, which in turn then relays same to the eNodeB. Furthermore, the eNodeB is thus able to schedule the radio resources suitable to the reception/transmission capabilities of the master UE (supposedly to be better than the ones of the wearable UE), for instance using the better RF band combination, MIMO capabilities, buffering capabilities, number of available HARQ processes, etc. Consequently, the scheduling could be more efficient/aggressive than possible with the capabilities of the wearable UE. This is especially advantageous for uplink transmissions that happen regularly (e.g., VoIP) or involve large data amounts (e.g., file uploads, backups, etc.). On the other hand, while the PUSCH (uplink data transmission) may be performed by the master UE, the transmission of the control information in the uplink via the PUCCH could still be performed by the wearable UE directly with the eNodeB.

Similarly, also downlink transmissions may either be conducted via the master UE or separately by the wearable UE. The master UE thus may have to monitor for downlink radio resource allocations (PDCCH) scheduled by the eNodeB and destined to the wearable UE. This can be done with the knowledge of C-RNTI of the W-UE at the M-UE. C-RNTI of the W-UE can be shared with the M-UE since the PC5 link is assumed to be secured between them or because of the fact that the Master UE indeed received the W-UE's C-RNTI from the eNB at the first place. On the other hand, the wearable UE might have to monitor on its own for downlink radio resource allocations (PDCCHs) scheduled by the eNodeB and destined to its own C-RNTI.

The decision on how to best distribute the uplink and downlink transmissions between the master UE and the wearable UE may also depend on the reception/transmission capabilities of the wearable UE and master UE.

The relaying of data destined to the wearable UE may also be specific to an application or bearer. For instance, bearers with higher latency demands may be directly configured to be transmitted to the wearable UE. Other bearers (e.g., involving transmission of a higher data volume) can be configured to be directly transmitted to the master UE using its better reception/transmission capabilities. Following this principle, control messages (PDCCH, PUCCH) that require short latencies could thus be transmitted directly via the LTE Uu link between the wearable UE and the eNodeB, without having the detour via the master UE.

Moreover, the grouping of the master UE and the wearable UE could be also exploited for other procedures performed in the radio or core network. For instance, a paging procedure is usually conducted by the eNodeB and/or the core network to page UEs in idle state. Consequently, in order to avoid that the wearable UE spends a lot of battery for monitoring whether it is paged or not, this procedure can be performed by the master UE on behalf of the wearable UE. Correspondingly, the master UE will monitor not only for paging messages destined to itself, but also for paging messages destined to the wearable UE(s) in its group. For instance, the paging occasion for the wearable UE will be actually calculated based on the credentials (e.g., IMSI) of the master UE. The master UE, upon receiving a corresponding paging message, shall of course inform the wearable UE via the PC5 interface.

Similarly, the master UE may act on behalf of the wearable UE(s) in its group for other procedures as well, such as acquisition of broadcasted system information, or conducting or replacing the RACH procedure, Paging reception, DRX optimization, RRM and CSI measurements, etc. Correspondingly, the wearable UE offloads these procedures to the master UE, knowing that the master UE will forward any relevant information to the wearable UE, e.g., what should be the effective DRX Cycle for the W-UE, or forwarding the Page message received for the W-UE or even the Mobility/Handover command to the W-UE, etc. In addition, the Master UE may act on behalf and actually supply the parameters for any procedure that deals with the location of the W-UE since the position/location of the both the devices are sufficiently close enough.

For most of the implementations of the first embodiment discussed above, it was assumed that the wearable UE would be assigned a C-RNTI of its own. However, it may also be possible that the wearable UE shares the C-RNTI of the master UE, i.e., does not have an own C-RNTI. For example, for DL the W-UE will only be able to discard the traffic belonging to the M-UE at the Layer 2 using the unique Logical Channel IDs that should only be used for either W-UE traffic or for M-UE traffic. In the UL the master UE also takes care that the Logical Channel Prioritization and Buffer Status reporting take care of this Logical Channel ID (LCD) and Logical Channel group separation. This is then like two devices sharing a C-RNTI however since the two devices support different capabilities, the network must address the transmission/reception from the devices keeping in mind the capability of the individual UE/device. For example, if Bearer1 of W-UE is being served directly with the W-UE and Bearer2 of W-UE is being served "via" the M-UE, then the network needs to ensure that it must take care of physical layer capabilities while sending/scheduling transmissions to each one of them.

Many different implementations of the first embodiment have been explained above, where the master UE may be responsible for transmitting and/or receiving data and/or control signaling of the wearable UE. The different implementations differ from one another, e.g., about what particular relaying is conducted by the master UE on behalf of the wearable UE (e.g., data and/or control signaling, only for UL, or for both UL and DL). These differences may thus also be reflected in the protocol distribution between the M-UE and the W-UE. In the following exemplary implementations of the first embodiment, the different possible protocol stacks at the M-UE and/or the W-UE will be explained in more detail.

Figure 10:
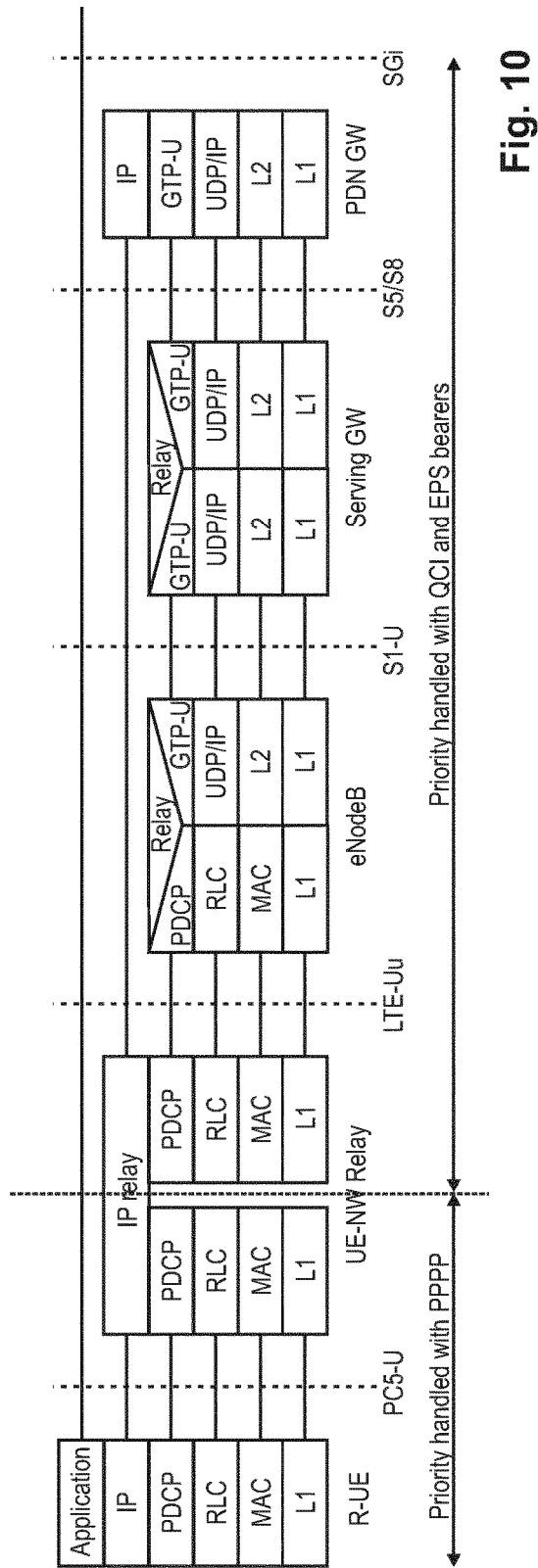
FIG. 10 shows the user plane protocol architecture for the ProSe UE-to-Network relay.

The general LTE ProSe-based protocol stacks (with UE-relay) was already explained in the background section in connection with FIG. 10. In the following, different exemplary protocol stacks will be presented.

Figure 19:
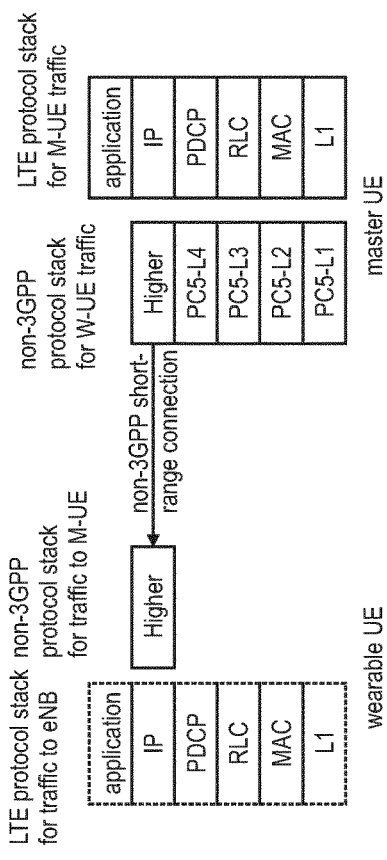
FIGS. 19 to 24 illustrate different protocol stacks architectures for the W-UE and M-UE according to various implementations of the first embodiment.

The Master UE may have two different protocol stacks, one for dealing with LTE ProSe sidelink traffic to/from the W-UE, and another one for dealing with its own traffic. This is schematically illustrated in FIG. 19. Consequently, for FIG. 19 it is assumed that the LTE ProSe technology is used for implementing the short-range connection across the PC5 interface. Correspondingly, the master UE may handle two separate grants for the two C-RNTIs of the master UE and the wearable UE, respectively using the corresponding separate LTE protocol stack. Furthermore, the LTE protocol stack for the master UE traffic (right-hand side in FIG. 19) is also responsible for relaying data that is received to/from the other sidelink protocol stack.

Similarly, the wearable UE will also have two separate LTE protocol stacks, one for the sidelink traffic with the Master UE (see SL-PDCP, SL-RLC, SL-MAC, SL-L1) and the other one for the traffic to the eNB via the LTE Uu interface. Correspondingly, the wearable UE is thus also capable of receiving UL/DL grants directly from the eNB.

Figure 25:
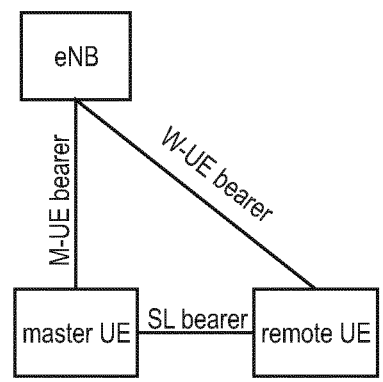
FIG. 25 illustrates the established bearers between the eNB, the W-UE and the M-UE.

In more detail, bearers towards the M-UE are distinguished from bearers towards the wearable UE. As already mentioned before, the data traffic may partly be routed directly to the wearable UE or via the master UE serving as a relay. From the viewpoint of the wearable UE, this is similar to a dual-connectivity scenario, where bearers are either set up towards the master eNodeB or the secondary eNodeB. The different bearers are exemplarily illustrated in FIG. 25.

During the attachment procedure as described in section 5.3.2 of TS 23.401 v13.6.1, the core network may also configure the bearer types, i.e., it decides which bearers/traffic are setup towards the M-UE or directly to the W-UE. However, the W-UE may be involved in this decision, which may depend on a number of different factors, such as W-UE and M-UE capabilities, remaining power/battery in the device (PPI, Power Preference Indicator), delay sensitivity and service type (conversational, streaming, background, etc.), etc. of the bearers. For example, the less delay-sensitive and traffic-heavy bearers can be offloaded via the M-UE.

The signaling flow could be similar to the Rel-13 UE-to-network relay operation, i.e., W-UE triggers ProSe Session establishment procedure and the M-UE will in consequence create a PDN connection for the W-UE traffic.

Here the assumption is that PC5 interface is used between W-UE and M-UE. The splitting of the traffic between PC5 interface and Uu interface in the W-UE can be done above PDCP. One implementation option for the dual connectivity based model could be to route all downlink traffic directly via the Uu interface to the W-UE, whereas all uplink data is transmitted via the M-UE.

On the other hand, instead of providing complete LTE protocol stacks in both the wearable UE and the master UE, it is also possible to provide "active" protocol stacks for UL and DL directions in only the wearable UE or the master UE, or even distribute the protocol stack between the two UEs, as will be explained in the following. The following, it is assumed that the PC 5 connection is implemented with a non-3GPP radio technology, such as Bluetooth or Wi-Fi. Correspondingly, the master UE and the wearable UE will have also non-3GPP protocol stacks.

Figure 20:
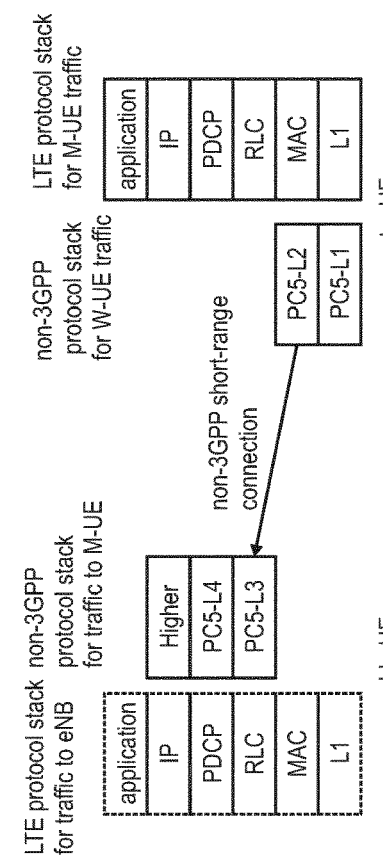
Figure 21:
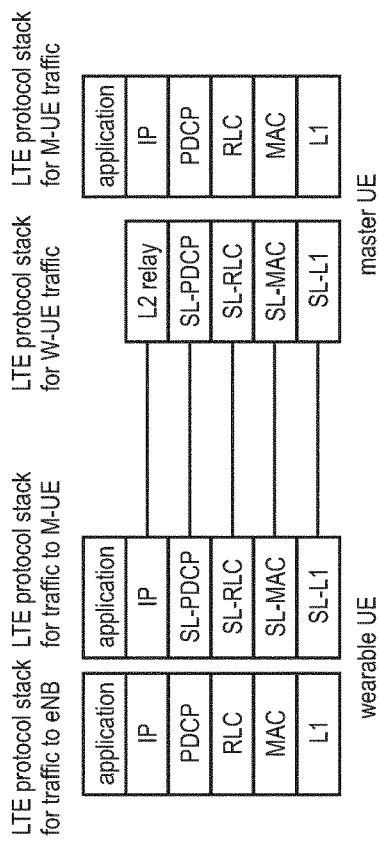
Figure 22:
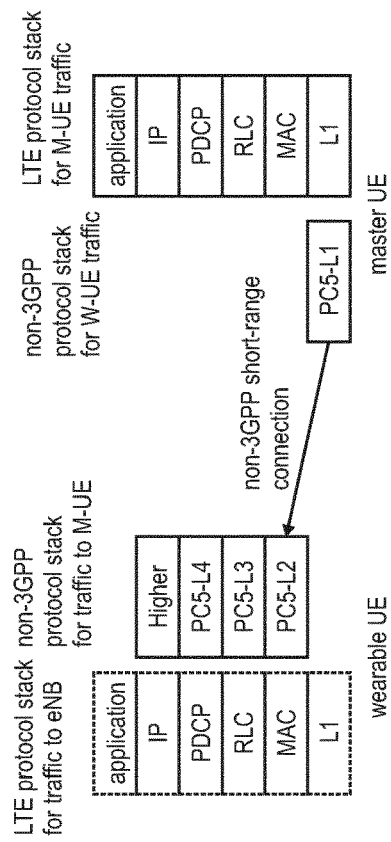
Figure 23:
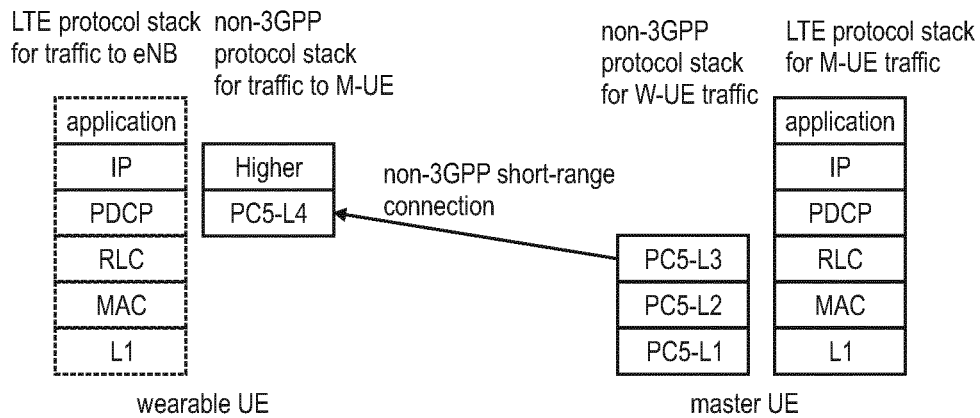

On the one hand, the entire non-3GPP protocol stack for the wearable UE could be located in the master UE, in which case all UL and DL control signaling and data transfer is actually performed by the M-UE. Correspondingly, the UL/DL control/data is then forwarded between the M-UE and the W-UE using the short-rage connection, which in this case is assumed to use a non-3GPP technology such as Bluetooth or WiFi. This is exemplarily depicted in FIG. 20. As apparent from FIG. 20 (see dashed LTE protocol stack to the eNB), it is also assumed that the wearable UE may still maintain the LTE Uu protocol stack for communicating directly with the eNB, thus being capable to also perform the usual LTE protocol tasks, such as monitoring/receiving the PDCCH, PDSCH, etc.). The master UE sends the application packets to the wearable UE via the PC 5 interface.

As mentioned above, for the uplink direction, one option would be to perform the uplink transmissions by the W-UE itself, or the other option would be to let the M-UE conduct (part or all of) the uplink transmission on behalf of the W-UE. By having the M-UE transmit in the uplink on behalf of the W-UE, power may be saved in the W-UE, thereby prolonging the battery life. However, this results in more complicated protocol stacks, and may be also problematic as to how fast/efficiently the control signaling (e.g., an UL-SCH grant) can be forwarded between the W-UE and the M-UE.

It should be noted that it is possible to combine the two grants in the M-UE itself such that all scheduled resources of the two grants are available to the M-UE, which then can conduct the Logical Channel Prioritization, LCP, procedure on that basis. Alternatively, the eNB can "combine" the two grants into a single grant, that is then transmitted to the eNB.

Figure 24:
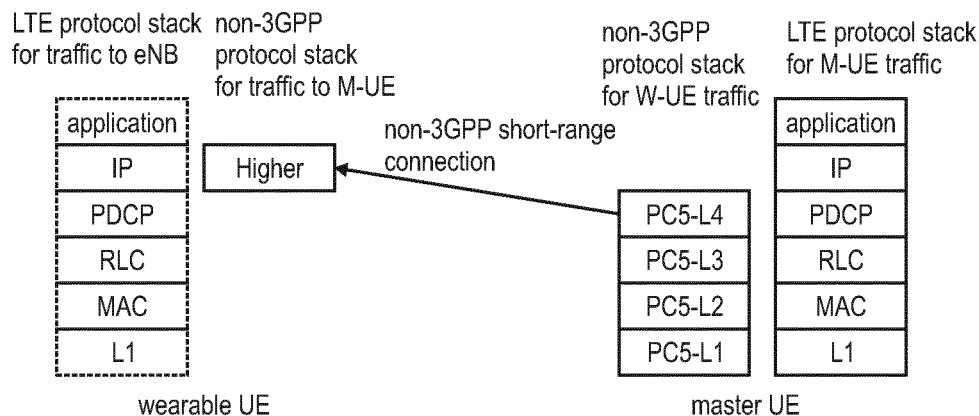

FIGS. 21 to 24 illustrate different distributions of the protocol stack between the master UE and the wearable UE, respectively where the distribution splits the sidelink protocol stack at the layer 1 (i.e., Physical layer; see FIG. 21), at the MAC layer (see FIG. 22), at the RLC layer (see FIG. 23), or at the PDCP layer (see FIG. 24).

Further Embodiments

According to a first aspect, a master mobile terminal is provided for grouping with a remote mobile terminal, wherein the master mobile terminal and the remote mobile terminal are connected to a radio base station in a mobile communication network. The master mobile terminal is capable to serve as a relay respectively for one or more remote mobile terminals so as to relay communication between the one or more remote mobile terminals and the radio base station. A transmitter and receiver of the master mobile terminal discovers the remote mobile terminal and an identifier of the remote mobile terminal. The transmitter transmits a group request message to the radio base station, the group request message comprising the remote mobile terminal identifier and a request to group the remote mobile terminal with the master mobile terminal. The receiver further receives a group request confirm message from the radio base station, confirming that the remote mobile terminal and the master mobile terminal are grouped together.

According to a second aspect which is provided in addition to the first aspect, the group request message is further a request for the radio base station to generate and assign a mobile terminal radio cell identifier to the remote mobile terminal. The group request confirm message comprises the assigned mobile terminal radio cell identifier of the remote mobile terminal. The transmitter further forwards the received mobile terminal radio cell identifier to the remote mobile terminal. Optionally, the transmitter informs the remote mobile terminal that the remote mobile terminal is grouped together with the master mobile terminal.

According to a third aspect which is provided in addition to the second aspect, the receiver monitors for radio resource allocations scheduled by the radio base station and destined to the mobile terminal radio cell identifier of the remote mobile terminal. In addition, or alternatively, the receiver monitors for paging messages transmitted by the radio base station and destined to the remote mobile terminal. In addition, or alternatively, the receiver and transmitter relay uplink data transmissions, received from the remote mobile terminal via a short-range connection, to the radio base station.

According to a fourth aspect which is provided in addition to one of the first to third aspects, the receiver and transmitter discover the remote mobile terminal after the receiver receives proximity information from the core network informing that the remote mobile terminal is in the proximity of the master mobile terminal. Optionally, the proximity information is received by the receiver in response to a proximity request, transmitted by the transmitter to the core network, to be informed when the remote mobile terminal is in the proximity of the master mobile terminal.

According to a fifth aspect which is provided in addition to one of the first to fourth aspects, the group request message comprises:
information on the capabilities of the remote mobile terminal, such as supported transmission modes, and/or
a request for radio resources to be used for communication with the remote mobile terminal, and/or
information on applications or services, data of which shall be relayed via the master mobile terminal.

According to a sixth aspect which is provided in addition to one of the first to fifth aspects, the transmitter transmits a pre-authorization request message to the core network requesting to pre-authorize that the remote mobile terminal will be grouped together with the master mobile terminal. Optionally, the pre-authorization request message is transmitted when performing a registration procedure with the core network for registering the master mobile terminal for use of direct sidelink communication with other mobile terminals, or together with a proximity request transmitted by the transmitter to the core network to be informed when the remote mobile terminal is in the proximity of the master mobile terminal.

According to a seventh aspect which is provided in addition to one of the first to sixth aspects, the transmitter transmits the group request message:
upon successfully discovering the remote mobile terminal, or
when the receiver receives an indication from the remote mobile terminal indicating that the remaining power of the remote mobile terminal is below a threshold, or
when the receiver receives a message from the remote mobile terminal indicating that the remote mobile terminal has data to transmit, optionally wherein the data to transmit is for a specific application or service, or
upon receiving a request from the remote mobile terminal to group with the master mobile terminal.

According to an eight aspect which is provided in addition to one of the first to seventh aspects, the master mobile terminal is connected to the remote mobile terminal via a short-range connection. The short-range connection is a direct sidelink connection, a Bluetooth connection or a WiFi connection. Optionally, the master mobile terminal is capable to relay communication with the remote mobile terminal via the short-range connection. Optionally, the remote mobile terminal is connected to the radio base station via a radio connection.

According to a ninth aspect which is provided in addition to the first to eight aspects, the transmitter transmits a group reconfiguration message to the radio base station, indicating that the remote mobile terminal is not to be grouped with the master mobile terminal. The receiver receives a group reconfiguration confirmation message from the radio base station confirming that remote mobile terminal is not part of the group. Optionally, the master mobile terminal stops monitoring the radio resource allocations scheduled by the radio base station destined to the mobile terminal radio cell identifier of the remote mobile terminal.

According to a tenth aspect, a remote mobile terminal is provided for terminal for grouping with a master mobile terminal, wherein the remote mobile terminal and the master mobile terminal are connected to a radio base station in a mobile communication network. The master mobile terminal is capable to serve as a relay respectively for one or more remote mobile terminals so as to relay communication between the one or more remote mobile terminals and the radio base station. A receiver and transmitter of the remote mobile terminal discover the master mobile terminal and an identifier of the master mobile terminal. The transmitter transmits a group request message to the radio base station, the group request message comprising the master mobile terminal identifier and a request to group the remote mobile terminal with the master mobile terminal. The receiver receives a group request confirm message from the radio base station, confirming that the remote mobile terminal and the master mobile terminal are grouped together.

According to an eleventh aspect which is provided in addition to the tenth aspect, the group request message is further a request for the radio base station to generate and assign a mobile terminal radio cell identifier to the remote mobile terminal. The group request confirm message comprises the assigned mobile terminal radio cell identifier of the remote mobile terminal. The transmitter further transmits the mobile terminal radio cell identifier of the remote mobile terminal to the master mobile terminal. Optionally, the transmitter further informs the master mobile terminal that the remote mobile terminal is grouped together with the master mobile terminal.

According to a twelfth aspect which is provided in addition to the tenth or eleventh aspect, the receiver receives from the master mobile terminal a radio resource allocation, scheduled by the radio base station and destined to the mobile terminal radio cell identifier of the remote mobile terminal but received by the master mobile terminal on behalf of the remote mobile terminal. In addition or alternatively, the receiver receives from the master mobile terminal a paging message transmitted by the radio base station and destined to the remote mobile terminal but received by the master mobile terminal on behalf of the remote mobile terminal. In addition or alternatively, the transmitter transmits uplink data transmission via a short-range connection to the master mobile terminal, the uplink data transmission to be relayed by the master mobile terminal further to the radio base station. In addition or alternatively, the receiver receives downlink data transmission from the radio base station via a radio connection established between the remote mobile terminal and the radio base station. In addition or alternatively, the transmitter transmits uplink control information to the radio base station via a radio connection established between the remote mobile terminal and the radio base station.

According to a thirteenth aspect which is provided in addition to one of the tenth to twelfth aspects, the receiver and transmitter discover the master mobile terminal after the receiver receives proximity information from the core network informing that the master mobile terminal is in the proximity of the remote mobile terminal. Optionally, the proximity information is received by the receiver in response to a proximity request, transmitted by the transmitter to the core network, to be informed when the master mobile terminal is in the proximity of the remote mobile terminal.

According to a fourteenth aspect which is provided in addition to one of the tenth to thirteenth aspects, the group request message comprises:
information on the capabilities of the remote mobile terminal, such as supported transmission modes, and/or
a request for radio resources to be used for communication with the master mobile terminal, and/or information on applications or services, data of which shall be relayed via the master mobile terminal.

According to a fifteenth aspect which is provided in addition to one of the tenth to fourteenth aspects, the transmitter transmits the group request message upon successfully discovering the master mobile terminal, or when the remaining power of the remote mobile terminal is below a threshold, or when the remote mobile terminal has data to transmit, optionally wherein the data to transmit is for a specific application or service.

According to a sixteenth aspect which is provided in addition to one of the tenth to fifteenth aspect, the transmitter transmits a group reconfiguration message to the radio base station, indicating that the remote mobile terminal is not to be grouped with the master mobile terminal. The receiver receives a group reconfiguration confirmation message from the radio base station confirming that remote mobile terminal is not part of the group. Optionally, the remote mobile terminal starts monitoring for radio resource allocations scheduled by the radio base station destined to the mobile terminal radio cell identifier of the remote mobile terminal, and/or the remote mobile terminal starts monitoring for paging messages transmitted by the radio base station and destined to the remote mobile terminal.

According to a seventeenth aspect the radio base station is provided station for assisting in grouping a remote mobile terminal with a master mobile terminal. The remote mobile terminal and the master mobile terminal are connected to a radio base station in a mobile communication network. The master mobile terminal is capable to serve as a relay respectively for one or more remote mobile terminals so as to relay communication between the one or more remote mobile terminals and the radio base station. A receiver of the radio base station receives a group request message from the master mobile terminal, the group request message comprising an identifier of the remote mobile terminal. A transmitter of the radio base station transmits a group validation request message to an entity of a core network for validating the grouping of the remote mobile terminal with the master mobile terminal. The receiver receives from the entity in the core network a group validation acknowledgment message, confirming that the remote mobile terminal and the master mobile terminal are grouped together. The transmitter transmits a group request confirm message to the master mobile terminal, confirming that the remote mobile terminal and the master mobile terminal are grouped together.

According to an eighteenth aspect which is provided in addition to the seventeenth aspect, the group request message is further a request by the master mobile terminal to generate and assign a mobile terminal radio cell identifier to the remote mobile terminal, and wherein processor of the radio base station generates and assigns the mobile terminal radio cell identifier to the remote mobile terminal. The group request confirm message comprises the assigned mobile terminal radio cell identifier of the remote mobile terminal.

According to a nineteenth aspect, a method for grouping a master mobile terminal and a remote mobile terminal is provided. The master mobile terminal and the remote mobile terminal are connected to a radio base station in a mobile communication network. The master mobile terminal is capable to serve as a relay respectively for one or more remote mobile terminals so as to relay communication between the one or more remote mobile terminals and the radio base station. The method comprises the following steps. Discovery between the master mobile terminal and the remote mobile terminal is performed. The master mobile terminal and the remote mobile terminal are grouped, including transmitting a group request message from the master mobile terminal or the remote mobile terminal to the radio base station. The group request message identifies the master mobile terminal and the remote mobile terminal and requests to group the remote mobile terminal with the master mobile terminal. The radio base station informs the remote mobile terminal and the master mobile terminal that they are grouped together.

According to a twentieth aspect which is based on the nineteenth aspect, the method comprises the further steps. Upon receiving the group request message, the radio base station request from an entity in the core network, whether the grouping of the remote mobile terminal with the master mobile terminal is authorized. Then, in case the entity of the core network authorizes the grouping, the radio base station performs the step of informing the remote mobile terminal and master mobile terminal that they are grouped together.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A master mobile terminal for grouping with a remote mobile terminal, the master mobile terminal and the remote mobile terminal configured to be connected to a radio base station in a mobile communication network, the master mobile terminal configured to serve as a relay for the remote mobile terminal so as to relay communication between the remote mobile terminal and the radio base station, the master mobile terminal comprising:
   circuitry configured to discover the remote mobile terminal and an identifier of the remote mobile terminal;
   a transmitter configured to transmit a group request message to the radio base station, the group request message including the identifier of the remote mobile terminal, a request to group the remote mobile terminal with the master mobile terminal, and a request for the radio base station to generate and assign a mobile terminal radio cell identifier to the remote mobile terminal; and
   a receiver configured to receive a group request confirm message from the radio base station, wherein
   the transmitter is configured to transmit, in response to the group request confirm message being received, a corresponding group request confirm message to the remote mobile terminal,
   each of the group request confirm message and the corresponding group request confirm message confirm the remote mobile terminal and the master mobile terminal are grouped together,
   each of the group request confirm message and the corresponding group request confirm message include the identifier of the remote mobile terminal and the mobile terminal radio cell identifier of the remote mobile terminal, and
   the receiver is configured to monitor for radio resource allocations scheduled by the radio base station and directed to the mobile terminal radio cell identifier of the remote mobile terminal.

2. The master mobile terminal according to claim 1,
   wherein the receiver is configured to monitor for paging messages transmitted by the radio base station and directed to the remote mobile terminal, or
   wherein the receiver is configured to receive uplink data transmissions from the remote mobile terminal via a short-range connection, and the transmitter is configured to relay the uplink data transmission to the radio base station via a short-range connection.

3. The master mobile terminal according to claim 1,
   wherein the receiver is configured to receive proximity information from a core network, the proximity information informing that the remote mobile terminal is in the proximity of the master mobile terminal,
   wherein the proximity information is received by the receiver in response to a proximity request, transmitted by the transmitter to the core network, to be informed when the remote mobile terminal is in the proximity of the master mobile terminal, and
   wherein the circuitry is configured to discover the remote mobile terminal after the receiver receives the proximity information from the core network.

4. The master mobile terminal according to claim 1, wherein the group request message includes:
   information on the capabilities of the remote mobile terminal, which includes supported transmission modes of the remote mobile terminal, or
   a request for radio resources to be used for communication with the remote mobile terminal, or
   information on applications or services, data of which shall be relayed via the master mobile terminal.

5. The master mobile terminal according to claim 1,
   wherein the transmitter is configured to transmit a pre-authorization request message to a core network requesting to pre-authorize that the remote mobile terminal will be grouped together with the master mobile terminal,
   wherein the pre-authorization request message is transmitted:
      in a case of a registration procedure being performed with the core network for registering the master mobile terminal for use of direct sidelink communication with other mobile terminals, or
      together with a proximity request transmitted by the transmitter to the core network to be informed when the remote mobile terminal is in the proximity of the master mobile terminal.

6. The master mobile terminal according to claim 1, wherein the transmitter is configured to transmit the group request message:
   upon successfully discovering the remote mobile terminal, or
   upon the receiver receiving an indication from the remote mobile terminal indicating that remaining power of the remote mobile terminal is below a threshold, or
   upon the receiver receiving a message from the remote mobile terminal indicating that the remote mobile terminal has data to transmit, wherein the data to transmit is for a specific application or service, or
   upon receiving a request from the remote mobile terminal to group with the master mobile terminal.

7. The master mobile terminal according to claim 1,
   wherein the master mobile terminal is configured to be connected to the remote mobile terminal via a short-range connection,
   wherein the short-range connection is a direct sidelink connection, a Bluetooth connection, or a WiFi connection,
   wherein the master mobile terminal is configured to relay communication with the remote mobile terminal via the short-range connection, and
   wherein the remote mobile terminal is configured to be connected to the radio base station via a radio connection.

8. The master mobile terminal according to claim 1,
   wherein the transmitter is configured to transmit a group reconfiguration message to the radio base station, the group reconfiguration message indicating that the remote mobile terminal is not to be grouped with the master mobile terminal,
wherein the receiver is configured to receive a group reconfiguration confirmation message from the radio base station, the group reconfiguration confirmation message confirming that remote mobile terminal is not part of the group, and
wherein the master mobile terminal is configured to stop monitoring radio resource allocations scheduled by the radio base station directed to the mobile terminal radio cell identifier of the remote mobile terminal.

9. A remote mobile terminal for grouping with a master mobile terminal, the remote mobile terminal and the master mobile terminal configured to be connected to a radio base station in a mobile communication network, the master mobile terminal configured to serve as a relay for the remote mobile terminal so as to relay communication between the remote mobile terminal and the radio base station, the remote mobile terminal comprising:
   circuitry configured to discover the master mobile terminal and an identifier of the master mobile terminal;
   a transmitter configured to transmit a group request message to the radio base station, the group request message including the identifier of the master mobile terminal, a request to group the remote mobile terminal with the master mobile terminal, and a request for the radio base station to generate and assign a mobile terminal radio cell identifier to the remote mobile terminal; and
   a receiver configured to receive a group request confirm message from the radio base station, the group request confirm message confirming that the remote mobile terminal and the master mobile terminal are grouped together, the group request confirm message including the mobile terminal radio cell identifier, wherein
   the transmitter is configured to transmit, in response to the group request confirm message being received, a corresponding group request confirm message to the master mobile terminal, the corresponding group request confirm message confirming that the remote mobile terminal and the master mobile terminal are grouped together, the corresponding group request confirm message including the mobile terminal radio cell identifier, and
   the master mobile terminal is configured to monitor for radio resource allocations scheduled by the radio base station and directed to the mobile terminal radio cell identifier of the remote mobile terminal.

10. The remote mobile terminal according to claim 9, wherein the transmitter is configured to transmit another group request confirm message to the master mobile terminal to inform the master mobile terminal that the remote mobile terminal is grouped together with the master mobile terminal.

11. The remote mobile terminal according to claim 9,
wherein the receiver is configured to receive, from the master mobile terminal, the radio resource allocations, or
wherein the receiver is configured to receive, from the master mobile terminal, a paging message transmitted by the radio base station and directed to the remote mobile terminal, the paging message being received by the master mobile terminal on behalf of the remote mobile terminal, or
wherein the transmitter is configured to transmit uplink data transmission via a short-range connection to the master mobile terminal, the uplink data transmission to be relayed by the master mobile terminal to the radio base station, or
wherein the receiver is configured to receive downlink data transmission from the radio base station via a radio connection established between the remote mobile terminal and the radio base station, or
wherein the transmitter is configured to transmit uplink control information to the radio base station via a radio connection established between the remote mobile terminal and the radio base station.

12. The remote mobile terminal according to claim 9, wherein the receiver is configured to receive proximity information from a core network, the proximity information informing that the master mobile terminal is in the proximity of the remote mobile terminal,
wherein the proximity information is received by the receiver in response to a proximity request, transmitted by the transmitter to the core network, to be informed when the master mobile terminal is in the proximity of the remote mobile terminal, and
wherein the circuitry is configured to discover the master mobile terminal after the receiver receives the proximity information from the core network.

13. The remote mobile terminal according to claim 9, wherein the group request message includes:
   information on the capabilities of the remote mobile terminal, which includes supported transmission modes of the remote mobile terminal, or
   a request for radio resources to be used for communication with the master mobile terminal, or
   information on applications or services, data of which shall be relayed via the master mobile terminal.

14. The remote mobile terminal according to claim 9, wherein the transmitter is configured to transmit the group request message:
   upon successfully discovering the master mobile terminal, or
   upon remaining power of the remote mobile terminal being below a threshold, or
   upon the remote mobile terminal having data to transmit, wherein the data to transmit is for a specific application or service.

15. The remote mobile terminal according to claim 9,
wherein the transmitter is configured to transmit a group reconfiguration message to the radio base station, the group reconfiguration message indicating that the remote mobile terminal is not to be grouped with the master mobile terminal,
wherein the receiver is configured to receive a group reconfiguration confirmation message from the radio base station, the group reconfiguration confirmation message confirming that remote mobile terminal is not part of the group, and
wherein the remote mobile terminal is configured to start monitoring for radio resource allocations scheduled by the radio base station directed to the mobile terminal radio cell identifier of the remote mobile terminal, or start monitoring for paging messages transmitted by the radio base station and directed to the remote mobile terminal.

16. A method for grouping a master mobile terminal and a remote mobile terminal, the master mobile terminal and the remote mobile terminal configured to be connected to a radio base station in a mobile communication network, the master mobile terminal configured to serve as a relay for the remote mobile terminal so as to relay communication between the remote mobile terminal and the radio base station, the method comprising:

discovering, by the master mobile terminal, the remote mobile and an identifier of the remote mobile terminal;

transmitting, by the master mobile terminal, a group request message to the radio base station, the group request message including the identifier of the remote mobile terminal, a request to group the remote mobile terminal with the master mobile terminal, and a request for the radio base station to generate and assign a mobile terminal radio cell identifier to the remote mobile terminal;

receiving, by the master mobile terminal, a group request confirm message from the radio base station;

transmitting, by the master mobile terminal and in response to the group request confirm message being received by the master mobile terminal, a corresponding group request confirm message to the remote mobile terminal, each of the group request confirm message and the corresponding group request confirm message confirming the remote mobile terminal and the master mobile terminal are grouped together, each of the group request confirm message and the corresponding group request confirm message including the identifier of the remote mobile terminal and the mobile terminal radio cell identifier of the remote mobile terminal; and monitoring, by the master mobile terminal, for radio resource allocations scheduled by the radio base station and directed to the mobile terminal radio cell identifier of the remote mobile terminal.

17. The method according to claim 16, the method further comprising:

upon receiving the group request message, requesting, by the radio base station and from an entity in a core network, whether the grouping of the remote mobile terminal with the master mobile terminal is authorized; and in a case of the entity of the core network authorizing the grouping, transmitting, by the radio base station the group request confirm message to the master mobile terminal.

\* \* \* \* \*

UNITED STATES PATENT AND TRADEMARK OFFICE
CERTIFICATE OF CORRECTION

PATENT NO. : 10,701,549 B2
APPLICATION NO. : 16/091668
DATED : June 30, 2020
INVENTOR(S) : Prateek Basu Mallick et al.

It is certified that error appears in the above-identified patent and that said Letters Patent is hereby corrected as shown below:

On the Title Page

Item (71) Applicants:
"Panasonic Intellectual Property Corporation of America, Torrance, CA (US); Prateek Basu Mallick, Hessen (DE)" should read -- Panasonic Intellectual Property Corporation of America, Torrance, CA (US) --.

Signed and Sealed this
Eleventh Day of August, 2020

Andrei Iancu
*Director of the United States Patent and Trademark Office*